United States Patent
Iglauer et al.

(10) Patent No.: US 11,740,021 B2
(45) Date of Patent: Aug. 29, 2023

(54) TREATMENT INSTALLATION AND METHOD FOR TREATING WORKPIECES

(71) Applicant: Dürr Systems AG, Bietigheim-Bissingen (DE)

(72) Inventors: Oliver Iglauer, Stuttgart (DE); Kevin Woll, Ilsfeld (DE); Dietmar Wieland, Waiblingen (DE); Joachim Wickenhaeuser, Holzgerlingen (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 17/393,198

(22) Filed: Aug. 3, 2021

(65) Prior Publication Data

US 2021/0381767 A1    Dec. 9, 2021

Related U.S. Application Data

(63) Continuation of application No. 16/774,526, filed on Jan. 28, 2020, now Pat. No. 11,112,177, which is a continuation of application No. 15/749,061, filed as application No. PCT/EP2016/068210 on Jul. 29, 2016, now Pat. No. 10,584,920.

(30) Foreign Application Priority Data

Jul. 31, 2015   (DE) .................... 10 2015 214 706.1

(51) Int. Cl.
*F26B 25/00*   (2006.01)
*B60S 3/00*    (2006.01)

(52) U.S. Cl.
CPC ............ *F26B 25/001* (2013.01); *B60S 3/002* (2013.01); *F26B 2210/12* (2013.01)

(58) Field of Classification Search
CPC ..... F26B 2210/12; F26B 25/001; B60S 3/002
USPC ........................................................ 34/666
See application file for complete search history.

(56) References Cited

U.S. PATENT DOCUMENTS

| 3,071,356 A | 1/1963 | Duffy |
| 3,467,366 A | 9/1969 | Westeren et al. |
| 3,851,402 A * | 12/1974 | Turnbull ................. F26B 21/14 34/538 |

(Continued)

FOREIGN PATENT DOCUMENTS

| CA | 2113807 | 2/1993 |
| CA | 1 336 537 C | 8/1995 |

(Continued)

OTHER PUBLICATIONS

Extended European Search Report issued in corresponding European Application No. 22190694.4, dated Jan. 26, 2023.

(Continued)

*Primary Examiner* — Stephen M Gravini
(74) *Attorney, Agent, or Firm* — Womble Bond Dickinson (US) LLP

(57) ABSTRACT

In order to provide a treatment installation for treating workpieces that is of simple construction and enables optimised workpiece treatment, it is proposed that the treatment installation should include a treatment chamber and a conveying device, by means of which the workpieces are suppliable to the treatment chamber, are removable from the treatment chamber, and/or are conveyable through the treatment chamber in a conveying direction.

26 Claims, 21 Drawing Sheets

(56) References Cited

U.S. PATENT DOCUMENTS

| | | |
|---|---|---|
| 4,150,494 A | 4/1979 | Rothchild |
| 4,627,814 A | 12/1986 | Hattori et al. |
| 4,740,158 A | 4/1988 | Johnson |
| 4,771,552 A | 9/1988 | Morioka |
| 4,864,942 A | 9/1989 | Fochtman et al. |
| 5,245,763 A | 9/1993 | Neikter |
| 5,249,960 A | 10/1993 | Monoe |
| 5,449,883 A | 9/1995 | Tsuruta |
| 5,556,466 A | 9/1996 | Martin et al. |
| 5,568,692 A | 10/1996 | Crompton et al. |
| 5,598,692 A | 2/1997 | Tsuzuki |
| 5,657,555 A | 8/1997 | Milojevic et al. |
| 6,418,636 B1 | 7/2002 | Sonner |
| 6,872,616 B2 | 3/2005 | Iwaida et al. |
| 6,935,052 B2 | 8/2005 | Sonner et al. |
| 7,181,864 B1 | 2/2007 | Coss |
| 7,200,953 B2 | 4/2007 | Sonner et al. |
| 7,260,901 B2 | 8/2007 | Doll |
| 7,488,518 B2 | 2/2009 | Ortlieb et al. |
| 7,600,329 B2 | 10/2009 | Ortlieb et al. |
| 7,658,017 B1 | 2/2010 | Laviolette et al. |
| 8,257,073 B2 | 9/2012 | Quetel et al. |
| 8,393,895 B2 | 3/2013 | Schwartz et al. |
| 8,431,180 B2 | 4/2013 | Fritz et al. |
| 8,658,240 B2 | 2/2014 | Fritz et al. |
| 8,732,980 B2 | 5/2014 | Napfel et al. |
| 8,897,374 B2 | 11/2014 | Yoshimura et al. |
| 8,910,396 B1 | 12/2014 | Burchell et al. |
| 8,997,374 B2 | 4/2015 | Sato |
| 9,316,406 B2 | 4/2016 | Wieland et al. |
| 9,322,594 B2 | 4/2016 | Bruckner |
| 9,333,521 B2 | 5/2016 | Holler et al. |
| 9,364,845 B2 | 6/2016 | Holler et al. |
| 9,394,110 B2 | 7/2016 | Robbin |
| 9,410,741 B2 | 8/2016 | Katefidis |
| 9,970,706 B2 | 5/2018 | Wieland et al. |
| 10,359,234 B2 * | 7/2019 | Robbin .............. F26B 3/04 |
| 10,584,920 B2 | 3/2020 | Iglauer et al. |
| 10,676,283 B2 * | 6/2020 | Gümbel ............. B65G 17/12 |
| 10,697,702 B2 | 6/2020 | Iglauer et al. |
| 11,112,177 B2 * | 9/2021 | Iglauer .............. F26B 25/001 |
| 11,167,305 B2 * | 11/2021 | Schwab ............. B05B 16/20 |
| 11,486,641 B2 * | 11/2022 | Gümbel ............. F25B 21/02 |
| 2002/0148137 A1 | 10/2002 | Eisenacher et al. |
| 2002/0153073 A1 | 10/2002 | Hattori et al. |
| 2005/0155253 A1 | 7/2005 | Sonner et al. |
| 2006/0051519 A1 | 3/2006 | Dixon et al. |
| 2006/0068094 A1 | 3/2006 | Cole |
| 2007/0104889 A1 | 5/2007 | Flothmann et al. |
| 2007/0144036 A1 | 6/2007 | Katefidis et al. |
| 2007/0218706 A1 | 9/2007 | Matsuoka |
| 2008/0115384 A1 | 5/2008 | Krizek et al. |
| 2008/0229608 A1 | 9/2008 | Krizek et al. |
| 2009/0016854 A1 | 1/2009 | Morohashi et al. |
| 2010/0038353 A1 | 2/2010 | Schwartz et al. |
| 2010/0127418 A1 | 5/2010 | Davidson et al. |
| 2010/0136160 A1 | 6/2010 | Quetel et al. |
| 2010/0273121 A1 | 10/2010 | Gleason et al. |
| 2011/0023314 A1 | 2/2011 | Schwerer et al. |
| 2011/0305543 A1 | 12/2011 | Nakashima et al. |
| 2012/0015102 A1 | 1/2012 | Nowack |
| 2013/0014406 A1 | 1/2013 | Weschke et al. |
| 2013/0312277 A1 | 11/2013 | Hihn |
| 2014/0020258 A1 | 1/2014 | Hihn et al. |
| 2014/0102857 A1 | 4/2014 | Heinsohn et al. |
| 2014/0173928 A1 | 6/2014 | Hauser |
| 2014/0227651 A1 | 8/2014 | Schwartz |
| 2015/0089827 A1 | 4/2015 | Sluka et al. |
| 2015/0214081 A1 | 7/2015 | Kikushi |
| 2015/0276315 A1 | 10/2015 | Schindler et al. |
| 2015/0354890 A1 | 12/2015 | Sluka |
| 2018/0216886 A1 | 8/2018 | Iglauer et al. |
| 2018/0238622 A1 | 8/2018 | Wieland et al. |
| 2018/0259262 A1 | 9/2018 | Iglauer et al. |
| 2018/0274859 A1 | 9/2018 | Hack |
| 2018/0319378 A1 | 11/2018 | Belanger et al. |
| 2018/0356154 A1 | 12/2018 | Iglauer et al. |
| 2019/0200649 A1 | 7/2019 | Tanaka |
| 2020/0166275 A1 | 5/2020 | Iglauer et al. |

FOREIGN PATENT DOCUMENTS

| | | |
|---|---|---|
| CA | 2 992 685 | 2/2017 |
| CA | 2 994 202 | 2/2017 |
| CN | 101959615 | 1/2011 |
| DE | 36 23 511 A1 | 1/1988 |
| DE | 91 09 134 | 11/1991 |
| DE | 199 41 184 | 3/2001 |
| DE | 199 41 760 | 3/2001 |
| DE | 201 04 204 | 8/2001 |
| DE | 201 04 205 | 8/2001 |
| DE | 100 45 608 | 3/2002 |
| DE | 101 47 199 | 4/2003 |
| DE | 103 54 165 B3 | 11/2004 |
| DE | 101 28 794 | 2/2005 |
| DE | 199 37 193 | 1/2006 |
| DE | 10 2004 057 139 | 6/2006 |
| DE | 197 56 194 | 6/2006 |
| DE | 10 2007 007 478 | 5/2008 |
| DE | 10 2008 024 088 | 1/2009 |
| DE | 10 2008 005 582 | 8/2009 |
| DE | 10 2008 012 792 | 9/2009 |
| DE | 10 2009 037 444 | 5/2010 |
| DE | 10 2009 001 640 | 9/2010 |
| DE | 10 2009 021 004 | 10/2010 |
| DE | 10 2008 046 492 | 6/2011 |
| DE | 10 2008 034 746 | 7/2011 |
| DE | 10 2010 002 179 | 8/2011 |
| DE | 10 2010 027 556 | 6/2012 |
| DE | 10 2011 017 354 | 10/2012 |
| DE | 10 2011 114 104 | 3/2013 |
| DE | 10 2011 117 666 | 5/2013 |
| DE | 10 2012 007 276 | 10/2013 |
| DE | 10 2012 018 296 | 10/2013 |
| DE | 10 2012 023 457 | 6/2014 |
| DE | 10 2012 222 688 | 6/2014 |
| DE | 10 2012 020 357 | 8/2014 |
| DE | 10 2013 203 089 | 8/2014 |
| DE | 10 2013 004 131 | 9/2014 |
| DE | 10 2013 004 136 | 9/2014 |
| DE | 10 2010 006 550 | 8/2015 |
| DE | 10 2014 003 912 | 9/2015 |
| DE | 10 2015 214 706 | 2/2017 |
| DE | 10 2015 214 711 | 2/2017 |
| DE | 10 2015 214706 | 2/2017 |
| EP | 1 080 788 B1 | 3/2001 |
| EP | 1 302 737 | 4/2003 |
| EP | 1 967 804 | 9/2008 |
| EP | 2 083 235 B1 | 7/2011 |
| EP | 2 060 863 B1 | 8/2013 |
| EP | 2 775 240 A2 | 9/2014 |
| EP | 2 775 241 A2 | 9/2014 |
| EP | 1 998 129 | 1/2015 |
| EP | 2 924 381 | 9/2015 |
| EP | 3 329 198 B1 | 3/2022 |
| GB | 2 276 708 A | 10/1994 |
| GB | 2 331 579 | 5/1999 |
| JP | S61 87573 U | 6/1986 |
| JP | S611-119093 | 7/1986 |
| JP | S64-34465 | 2/1989 |
| JP | H02-270715 | 11/1990 |
| JP | H08 155372 A | 6/1996 |
| JP | 2000-070823 | 3/2000 |
| JP | 2000-334367 | 12/2000 |
| JP | 2003-236437 | 8/2003 |
| JP | 2005-058870 | 3/2005 |
| JP | 2006-026476 | 2/2006 |
| JP | 2007-044582 A | 2/2007 |
| JP | 2007-085630 | 4/2007 |
| JP | 2008 178803 | 8/2008 |
| JP | 2008-178803 A | 8/2008 |
| JP | 4-171226 | 10/2008 |
| JP | 2009-195840 | 9/2009 |
| JP | 3174838 | 4/2012 |

(56) References Cited

FOREIGN PATENT DOCUMENTS

| WO | WO 02/073109 | 9/2002 |
| WO | WO 2011/092224 | 8/2011 |
| WO | WO 2013/004520 | 1/2013 |
| WO | WO 2014/063797 | 5/2014 |
| WO | WO 2017/021324 | 2/2017 |
| WO | WO 2017/021326 | 2/2017 |

OTHER PUBLICATIONS

Communication of a Notice of Opposition issued in corresponding European Patent No. 3329200, dated Jun. 12, 2023.
Grote, K.-H., et al., "Dubbel Taschenbuch für den Maschinenbau" Springer, 2011.
Office Action issued in corresponding Vietnam Patent Application No. 1-2018-00360, dated Apr. 17, 2023.

* cited by examiner

TREATMENT INSTALLATION AND METHOD FOR TREATING WORKPIECES

CROSS-REFERENCE TO RELATED APPLICATIONS

This application is a continuation of U.S. application Ser. No. 16/774,526, filed Jan. 28, 2020, which is a continuation of U.S. application Ser. No. 15/749,061, filed Jan. 30, 2018, which is a U.S. national stage filing under 35 U.S.C. 371 of International Patent Application PCT/EP2016/068210, filed Jul. 29, 2016, and claims priority to German Patent Application No. 10 2015 214 706.1, filed on Jul. 31, 2015, which disclosures are hereby incorporated by references in their entirety in this application.

FIELD OF THE DISCLOSURE

The present invention relates to a treatment installation and a method for treating workpieces. In particular, a treatment installation serves to dry coated vehicle bodies. The method for treating workpieces is thus in particular a method for drying coated vehicle bodies.

BACKGROUND

Treatment installations and treatment methods are known in particular from EP 1 998 129 B1, US 2006/0068094 A1, EP 1 302 737 A2 and WO 02/073109 A1.

SUMMARY OF THE INVENTION

The object of the present invention is to provide a treatment installation that is of simple construction and enables optimised workpiece treatment.

According to the invention, this object is achieved by a treatment installation for treating workpieces, for example for drying coated vehicle bodies, wherein the treatment installation includes a treatment chamber and a conveying device, by means of which the workpieces are suppliable to the treatment chamber, are removable from the treatment chamber, and/or are conveyable through the treatment chamber in a conveying direction.

In one embodiment of the invention, it may be provided for the workpieces to be receivable by means of the conveying device and to be conveyable through the treatment chamber, at least in certain regions, such that a longitudinal direction of the workpieces is oriented at least approximately horizontally and/or transversely, in particular substantially perpendicular, to the conveying direction. An upright axis of the workpiece, which in the finished condition of the workpiece is oriented at least approximately vertically, is oriented during conveying of the workpiece through the treatment chamber preferably at least approximately vertically or at least approximately horizontally.

In particular, it may be provided for the workpieces to be receivable by means of the conveying device and to be conveyable through the treatment chamber, at least in certain regions, such that a longitudinal direction of the workpieces is oriented at least approximately horizontally and/or forms an angle of at least approximately 90° with the conveying direction.

For example, for the purpose of conveying the workpieces in an at least approximately horizontal plane, they are arranged rotated by at least approximately 90° in relation to the conveying direction about an at least approximately vertical axis.

In this description and the attached claims, the terms "at least approximately" and "approximately" should be understood to mean preferably a deviation of at most +/−20%, for example at most +/−10%, in particular at most +/−5%, from the stated value.

It may be advantageous if the treatment installation includes at least one inlet opening for supplying gas to the treatment chamber and at least one outlet opening for removing gas from the treatment chamber, which are preferably arranged on mutually opposing sides of the workpiece.

At least one inlet opening and/or at least one outlet opening may be arranged and/or formed for example in a wall that delimits the treatment chamber.

As an alternative or in addition thereto, it may be provided for at least one inlet opening and/or at least one outlet opening to be formed by an end region of a flow guide that opens into the treatment chamber. A flow guide of this kind may for example include one or more flow diverting elements or flow guiding elements and/or a guide duct. The significant point here is preferably that a region of the flow guide that forms the at least one inlet opening and/or the at least one outlet opening serves to discharge at least a large part of the supplied gas stream to the treatment chamber and/or to guide out at least a large part of the gas stream that is guided out of the treatment chamber, in particular regardless of whether or not, before the gas stream is supplied to the treatment chamber and/or after it has been removed from the treatment chamber, it is still guided in certain regions within an internal contour of the housing surrounding the treatment chamber and/or within the treatment chamber.

Preferably, the at least one inlet opening on the one hand and the at least one outlet opening on the other are arranged on mutually different sides of a vertical workpiece transverse centre plane.

A vertical workpiece transverse centre plane is in particular a plane that is oriented perpendicular to a workpiece longitudinal direction and runs through the centre of gravity and/or a centre point of the workpiece that is central in relation to a workpiece longitudinal direction.

It may be favourable if all the inlet openings on the one hand and all the outlet openings on the other are arranged on mutually different sides of a vertical workpiece transverse centre plane. In one embodiment of the invention, it may be provided for at least one inlet opening and at least one outlet opening to be arranged at a distance from one another that is at least approximately 60%, in particular at least approximately 80%, for example at least approximately 100%, of a total length of the workpiece, as seen in a workpiece longitudinal direction.

It may be advantageous if the at least one inlet opening and the at least one outlet opening are arranged offset in relation to the conveying direction.

The at least one inlet opening and the at least one outlet opening are preferably associated with a holding position of a workpiece in which the workpiece remains at least temporarily. By offsetting the at least one inlet opening and the at least one outlet opening in relation to the conveying direction, preferably a gas flow with a vector component in the conveying direction can be achieved. In particular, it may be provided for a gas stream to flow in the conveying direction through a workpiece that is in the holding position.

It may be provided for the treatment installation to include at least one inlet opening for supplying gas to the treatment chamber and at least one outlet opening for removing gas from the treatment chamber, wherein the at least one inlet opening on the one hand and the at least one outlet opening on the other are arranged on different sides of the treatment chamber in relation to a vertical longitudinal centre plane of the treatment chamber.

The vertical longitudinal centre plane is preferably a plane that is arranged centrally in relation to a maximum or average horizontal transverse extent of the treatment chamber.

The vertical longitudinal centre plane in particular runs parallel to the conveying direction.

The transverse extent is in particular an extent in a direction running perpendicular to the conveying direction.

It may be favourable if the treatment installation includes one or more inlet openings for supplying gas to the treatment chamber and/or one or more outlet openings for removing gas from the treatment chamber.

Preferably, the one or more, in particular all, of the inlet openings are arranged in one of two semi-chambers of the treatment chamber that are divided by a longitudinal centre plane that runs vertically, horizontally or obliquely thereto.

As an alternative or in addition thereto, it may be provided for the one or more, in particular all, of the outlet openings to be arranged in one of the two semi-chambers of the treatment chamber that are divided by the longitudinal centre plane that runs vertically, horizontally or obliquely thereto.

In particular, it may be provided for the one or more, in particular all, of the inlet openings to be arranged in a first semi-chamber and the one or more, in particular all, of the outlet openings to be arranged in a further, in particular second, one of the two semi-chambers.

By arranging the inlet openings and/or the outlet openings in each case preferably in only one of two semi-chambers of the treatment chamber, it is possible in particular to supply gas on one side and/or to remove gas on one side.

Preferably, the treatment installation includes a plurality of inlet openings for supplying gas to the treatment chamber and a plurality of outlet openings for removing gas from the treatment chamber, wherein the inlet openings on the one hand and the outlet openings on the other are preferably arranged at least approximately opposite one another in relation to a diagonal plane, wherein the diagonal plane extends parallel to the conveying direction and substantially diagonally through the treatment chamber.

Preferably, the diagonal plane forms an angle of at least approximately 40°, for example approximately 45°, and/or at most approximately 50° with the direction of gravity.

In one embodiment of the invention, it may be provided for the treatment installation to include a plurality of inlet openings for supplying gas to the treatment chamber and a plurality of outlet openings for removing gas from the treatment chamber, wherein the inlet openings and the outlet openings are arranged such that gas is flowable through the treatment chamber transversely, in particular substantially perpendicular, to the conveying direction and/or at least approximately diagonally.

The treatment installation preferably includes at least one circulating air module.

In particular, a plurality of circulating air modules of the treatment installation may be provided.

A circulating air module, in particular each circulating air module, preferably includes the following:

a gas supply for supplying gas to the treatment chamber; and/or a gas removal arrangement for removing gas from the treatment chamber; and/or a fan device for driving a circulating air gas stream; and/or a separation device for separating contaminants out of the circulating air gas stream; and/or a distributor device for distributing the circulating air gas stream that is to be supplied to the treatment chamber over a plurality of inlet openings of the gas supply; and/or a collecting device by means of which the circulating air gas stream that is removed from the treatment chamber through a plurality of outlet openings of the gas removal arrangement is mergeable.

Preferably, the treatment installation includes a plurality of circulating air modules that succeed one another in the conveying direction.

Each circulating air module preferably forms a section, in particular a complete section, of the treatment installation.

In particular, a circulating air module includes a circulating air device that is dockable onto a housing that surrounds the treatment chamber.

A circulating air module in particular includes a section of the housing that surrounds the treatment chamber, and a circulating air device.

In this description and the attached claims, the term "circulating air" does not necessarily refer to the gas "air". Rather, the term "circulating air" preferably designates a gas that is guided in a circuit and is in particular processed and/or re-used a plurality of times.

Preferably, no connection ducts are provided between the circulating air device and the housing that surrounds the treatment chamber. Rather, the circulating air device and the housing that surrounds the treatment chamber preferably have a common wall.

A gas stream is preferably guidable from the circulating air device and into the treatment chamber through an opening or recess in the common wall.

The gas supply or gas removal arrangement may be a constituent part of the circulating air device or alternatively of the housing that surrounds the treatment chamber. Accordingly, the opening in the common wall is suitable for supplying gas to the gas supply or alternatively for supplying gas to the treatment chamber.

The treatment installation preferably includes at least one flushing module.

In particular, a plurality of flushing modules of the treatment installation may be provided.

A flushing module, in particular each flushing module, preferably includes the following:

a gas supply for supplying gas to the treatment chamber; and/or a gas removal arrangement for removing gas from the treatment chamber; and/or a fan device for driving a flushing gas stream; and/or a separation device for separating contaminants out of the flushing gas stream; and/or a distributor device for distributing the flushing gas stream that is to be supplied to the treatment chamber over a plurality of inlet openings of the gas supply; and/or a collecting device by means of which the flushing gas stream that is removed from the treatment chamber through a plurality of outlet openings of the gas removal arrangement is mergeable.

Preferably, the treatment installation includes a plurality of flushing modules that succeed one another in the conveying direction.

Each flushing module preferably forms a section, in particular a complete section, of the treatment installation.

In particular, a flushing module includes a flushing gas device that is dockable onto a housing that surrounds the treatment chamber.

A flushing module in particular includes a section of the housing that surrounds the treatment chamber, and a flushing gas device.

Preferably, no connection ducts are provided between the flushing gas device and the housing that surrounds the treatment chamber. Rather, the flushing gas device and the housing that surrounds the treatment chamber preferably have a common wall.

A gas stream is preferably guidable from the flushing gas device and into the treatment chamber through an opening or recess in the common wall.

The gas supply or gas removal arrangement may be a constituent part of the flushing gas device or alternatively of the housing that surrounds the treatment chamber. Accordingly, the opening in the common wall is suitable for supplying gas to the gas supply or alternatively for supplying gas to the treatment chamber.

One or more circulating air modules or all the circulating air modules of the treatment installation and/or one or more flushing modules or all the flushing modules of the treatment installation may have individual or a plurality of or all the features and/or advantages that are described in conjunction with one module.

One or more modules or all the modules of the treatment installation preferably each include one or more transport units or are each formed from one or more transport units.

A transport unit is in particular a transportable unit that may be transported from one location to another location as a whole and/or without further subdivision or further dismantling into constituent parts of the transport unit. For example, a transport unit is transportable as a whole by a heavy goods vehicle for receiving standard containers, ISO containers or maritime freight containers.

For example, it may be provided for one or more modules or all the modules each to include a plurality of transport units, for example three transport units, that together form or surround a treatment chamber section of the module. In addition, there is preferably associated with each module or each of these transport units a device, in particular a circulating air device and/or a flushing gas device.

It may be provided for a device, in particular a circulating air device and/or a flushing gas device, to be associated with only one transport unit of a module.

In particular, it may be provided for a device, in particular a circulating air device and/or a flushing gas device, to be associated with only one transport unit, for example a centrally arranged transport unit, of three transport units of a module that together form or surround a treatment chamber section of the module. In this case, one or more annular gas flows are producible for example in only this transport unit.

A device, in particular a circulating air device and/or a flushing gas device, preferably forms a further transport unit of the module.

It may be advantageous if a longitudinal extent of a device, in particular of a circulating air device and/or a flushing gas device, in the conveying direction corresponds at least approximately to a longitudinal extent of a transport unit in the conveying direction.

It may be favourable if there are producible or produced, in one or more transport units or in all transport units that form or surround a treatment chamber section of the module, in each case precisely one annular gas flow or a plurality of annular gas flows.

It may be advantageous if there is associated with one or more, in particular all, of the transport units in each case precisely one processing cycle and/or in each case precisely one processing position (workpiece station) for processing workpieces. Within this one or more, in particular all, of the transport units there is then preferably in each case only a single holding position in which the workpieces are stopped one after the other in order to perform a treatment procedure.

However, it may also be provided for there to be associated with one or more, in particular all, of the transport units in each case a plurality of processing cycles and/or in each case a plurality of processing positions (workpiece stations) for processing workpieces. Within this one or more, in particular all, of the transport units there are then preferably in each case a plurality of holding positions in which the workpieces are stopped one after the other in order to perform one or more treatment procedures.

The distributor device is preferably separated from the treatment chamber by means of a dividing wall.

Preferably, the distributor device is arranged and/or formed entirely on one side of the treatment chamber.

The dividing wall forms or is in particular a side wall of the treatment chamber or a section of a side wall of the treatment chamber.

One or more inlet openings, optionally all the inlet openings, are preferably made in the dividing wall.

The dividing wall is preferably arranged within the housing that surrounds the treatment chamber. The distributor device is in that case preferably a constituent part of the housing that surrounds the treatment chamber.

However, it may also be provided for the dividing wall to be in particular a common wall between the circulating air device or the flushing gas device on the one hand and the housing that surrounds the treatment chamber on the other.

As an alternative or in addition to at least one inlet opening arranged in a dividing wall, it may be provided for at least one inlet opening to be arranged in a base wall of the housing that surrounds the treatment chamber and/or in a top wall of the housing that surrounds the treatment chamber.

In particular, a plurality of the above-described inlet openings may be provided.

It may be favourable if the dividing wall is formed to follow a workpiece contour, for example a workpiece longitudinal contour, at least in certain regions.

It may be advantageous if the treatment installation is a treatment installation for treating vehicle bodies and the dividing wall includes a substantially vertical section that runs at least approximately parallel to a vehicle front or a vehicle rear of a vehicle body, a substantially horizontal section that runs at least approximately parallel to a front hood or rear hood of the vehicle body, and/or an oblique section that runs at least approximately parallel to A pillars or C pillars of the vehicle body.

It may be favourable if the dividing wall includes a plurality of inlet openings in the substantially vertical section that runs at least approximately parallel to a vehicle front or a vehicle rear of a vehicle body and/or a plurality of inlet openings in the oblique section that runs at least approximately parallel to A pillars or C pillars of the vehicle body.

The treatment installation, in particular the treatment chamber, is preferably adapted to an external shape of a vertical longitudinal section of the workpieces, and in particular takes a form that at least approximately complements an external shape of a vertical longitudinal section of the workpieces.

For example, one or both side walls of the treatment chamber, for example a dividing wall and/or a side wall opposing the dividing wall, and/or a top wall and/or a base wall of the treatment chamber are adapted to an external shape of a vertical longitudinal section of the workpieces, and in particular take a form that at least approximately complements an external shape of a vertical longitudinal section of the workpieces.

An external shape of a vertical longitudinal section is in particular a maximum external contour of the workpieces when the workpieces are seen in section along a vertical longitudinal centre plane.

It may be favourable if the treatment installation includes a plurality of flushing modules and/or a plurality of circulating air modules, wherein each circulating air module preferably forms a heating zone and/or a holding zone and/or a cooling zone of the treatment chamber.

Preferably, the treatment installation has a plurality of modules, in particular circulating air modules and/or flushing modules, that succeed one another in the conveying direction.

It may be advantageous if the collecting device includes a collecting duct that is preferably arranged outside the treatment chamber and into which a plurality of outlet openings open.

As an alternative or in addition thereto, it may be provided for the collecting device to include a return duct by means of which the circulating air gas stream or flushing gas stream removed from the treatment chamber through a plurality of outlet openings is guidable to the fan device, the separation device and/or the distributor device.

Preferably, the treatment installation, in particular one or more circulating air modules or each circulating air module of the treatment installation, includes one or more return ducts that each connect one or more outlet openings, through which a gas stream, in particular a circulating air gas stream and/or a flushing gas stream, is removable from the treatment chamber, to a respective one or more inlet openings for supplying the circulating air gas stream and/or a flushing gas stream to the treatment chamber.

The return ducts are preferably mutually independent return ducts. For example, one or more circulating air modules or all the circulating air modules each include a plurality of mutually independent return ducts.

The return ducts preferably run or extend at least approximately along planes that are oriented perpendicular to the conveying direction.

By means of each return duct and the at least one outlet opening and at least one inlet opening that are connected to one another by the respective return duct, an annular gas flow is preferably produced within a circulating air module, and this annular gas flow preferably extends at least approximately along a plane that is oriented perpendicular to the conveying direction.

Preferably, there are formed in one or more circulating air modules or all the circulating air modules in each case a plurality of annular gas flows that are substantially mutually independent and/or run parallel to one another.

An effective main flow direction of the gas stream guided through the treatment chamber preferably forms an angle of at least approximately 70°, for example at least approximately 80°, in particular at least approximately 85°, with the conveying direction. This preferably allows an undesired longitudinal flow of the gas stream in the conveying direction to be minimised.

It may be favourable if a fan device is associated with a plurality of return ducts and/or annular gas flows.

For example, one or more circulating air modules or each circulating air module of the treatment installation each include(s) a fan device and a plurality of return ducts and/or annular gas flows associated with this fan device.

Further, it may be provided for one or more circulating air modules or each circulating air module of the treatment installation to include a plurality of fan devices and a plurality of return ducts and/or annular gas flows, wherein a separate fan device is associated with each return duct and/or each annular gas flow.

One or more fan devices preferably each include a rotating impeller that is in particular a ventilator element having air blades.

An axis of rotation of the impeller is preferably oriented at least approximately parallel or at least approximately perpendicular to the conveying direction.

As an alternative or in addition thereto, it may be provided for an axis of rotation of the impeller to be oriented at least approximately horizontally or at least approximately vertically.

One or more fan devices in particular take the form of a radial ventilator or axial ventilator.

A main flow direction of a gas stream, in particular an annular gas stream, in one or more return ducts is preferably oriented at least approximately perpendicular to the conveying direction and/or at least approximately horizontally.

In one embodiment of the invention, it may be provided for one or more circulating air modules or each circulating air module of the treatment installation to each include one or more inlet openings, one or more outlet openings and/or one or more return ducts, wherein the one or more inlet openings, the one or more outlet openings and/or the one or more return ducts are arranged in common on one side of a diagonal plane that diagonally divides the treatment chamber and/or the treatment installation.

In particular, it may be provided for the one or more inlet openings, one or more outlet openings and/or one or more return ducts to be arranged in common below or above a diagonal plane that diagonally divides the treatment chamber and/or the treatment installation.

The diagonal plane in particular extends in the conveying direction and/or along a line of intersection or boundary line between a first side wall of the treatment chamber and a top wall of the treatment chamber and/or along a line of intersection or boundary line between a second side wall of the treatment chamber and a base wall of the treatment chamber, wherein the side walls are preferably arranged opposite one another in relation to a vertical longitudinal centre plane of the treatment chamber.

One of the two side walls of the treatment chamber is preferably formed by a dividing wall that separates a distributor device from the treatment chamber.

The line of intersection or boundary line between the first side wall of the treatment chamber and the top wall of the treatment chamber on the one hand and the line of intersection or boundary line between the second side wall of the treatment chamber and the base wall of the treatment chamber on the other have a distance from each other in the horizontal direction, wherein this distance is at least approximately 40%, in particular at least approximately 60%, for example at least approximately 80%, of a total width of the treatment chamber in a transverse direction as seen horizontally and perpendicular to the conveying direction.

It may be advantageous if one or more circulating air modules or each circulating air module of the treatment installation includes variably sizeable and/or differently sized and/or adjustable and/or regulable outlet openings, inlet openings and/or return ducts.

The outlet openings, the inlet openings and/or the return ducts are preferably variably sizeable and/or of different sizes and/or adjustable and/or regulable in relation to a cross section of flow.

It may be favourable if a direction of flow, a flow rate and/or a volumetric flow of the gas stream that is guided through the treatment chamber is locally influenceable or influenced by means of the outlet openings, the inlet openings and/or the return ducts, for example for removal of gas by suction and/or supply of gas at a particular point.

In particular, it may be provided for an outlet opening that is arranged below the workpiece to have a cross section of flow that is reduced by comparison with an associated inlet opening, with the result that a flow rate below the workpiece is increased.

In one embodiment of the invention, it may be provided for one or more outlet openings that are arranged below the workpiece to be arranged offset in the direction of the workpiece, starting from a base wall or side wall of the treatment chamber. For example, one or more guide ducts may be provided that project into the treatment chamber from the base wall or side wall and in particular enable gas close to the workpiece to be removed.

In a preferred embodiment of the invention, it may be provided for one or more outlet openings that are arranged below the workpiece to be arranged offset at least approximately vertically upwards in the direction of the workpiece, starting from a base wall of the treatment chamber. For example, one or more guide ducts may be provided that project upwards into the treatment chamber from the base wall and in particular enable gas close to the workpiece to be removed.

One or more openings in the one or more guide ducts, these openings being arranged facing away from the base wall or side wall, preferably form the one or more outlet openings.

The treatment installation preferably includes a gas supply by means of which a gas stream is directable into an interior of a workpiece.

A stream that is designated in general as a "gas stream" may in particular be a circulating air gas stream, a flushing gas stream, an inert gas stream, etc.

In one embodiment of the invention, it may be provided for the treatment installation to include at least one gas supply that includes at least one inlet opening by means of which a gas stream is directable into an interior of the workpiece at least approximately perpendicular to an entry plane of an entry opening in a workpiece.

The entry opening is in particular an opening in which, in the assembled condition of a workpiece that takes the form of a motor vehicle, a front screen (windscreen) or rear screen is arranged.

The entry plane is in particular a plane on which a border of the entry opening extends. In the case of a border that is curved in three dimensions, the entry plane is a plane in which three or more points that are furthest from the inlet opening, in particular corner points, of the border are arranged. In the case of a mirror-symmetrical border, the border and the entry plane preferably have a common plane of symmetry.

It may be favourable if a gas stream, in particular a hot gas stream, a flushing gas stream and/or a cooling gas stream, is directed through an entry opening in a workpiece and into an interior of the workpiece, wherein a proportion of a volumetric flow of the gas stream that is directed into the interior of the workpiece through the entry opening represents at least approximately 50%, preferably at least approximately 75%, of a volumetric flow of a total gas stream that is directed onto and/or into the workpiece.

It may be provided for the treatment installation to include a gas removal arrangement by means of which a gas stream on a side of the workpiece facing away from a b arrangement is removable from the treatment chamber.

In particular, the treatment installation preferably includes at least one inlet opening and at least one outlet opening that are arranged on mutually opposing sides of the workpiece.

It may be provided for the treatment installation to include at least one inlet opening, for supplying gas to the treatment chamber, and at least one outlet opening, for removing gas from the treatment chamber, which are arranged on mutually opposing sides of the workpiece, wherein preferably flow through the treatment chamber is provided such that at least 70%, preferably at least 90%, of the gas flowing in through this at least one inlet opening is removable from the treatment chamber through this at least one outlet opening.

The at least one inlet opening and the at least one outlet opening are preferably arranged offset from one another in relation to a workpiece longitudinal direction.

The workpiece longitudinal direction and the conveying direction may be oriented for example parallel or transversely, in particular perpendicular, to one another.

It may be advantageous if the at least one inlet opening is arranged in a front region of a workpiece or in a rear region of a workpiece, while the at least one outlet opening is preferably arranged respectively in a rear region or a front region of the workpiece.

It may be favourable if the treatment installation includes at least one outlet opening, for removing gas from the treatment chamber, that is arranged in a base wall or side wall or top wall that delimits the treatment chamber.

The treatment chamber is preferably arranged in a housing (casing). Preferably, the treatment chamber is delimited by a base wall, a side wall, a further side wall or dividing wall and/or a top wall of the housing.

In this description and the attached claims, the term "drying" of the workpiece should be understood to mean in particular converting a coating that has been applied to the workpiece from a condition directly after application of the coating to a condition in which the coating is stable over the long term.

In particular, drying of the workpiece is removal of solvent, curing of the applied coating, solidification of the applied coating, etc.

It may be favourable if the treatment installation includes a plurality of modules, in particular circulating air modules and/or flushing modules, that are coupled, in particular supplied, by means of a common energy module.

The energy module is in particular a so-called power module.

It may be provided for the conveying device to include a rotation device by means of which a rotational orientation of the workpieces about a vertical axis of rotation is variable.

A vertical axis of rotation is in particular an axis oriented parallel to the direction of gravity.

By means of a rotation device of the conveying device, a rotational orientation of the workpieces can preferably be varied such that the workpieces are conveyable in a more bulky first rotational orientation and are then movable into a less bulky second rotational orientation in order to be guided through a constriction point. A constriction point of this kind may in particular be a lock.

Once it has passed through the constriction point, the respective workpiece may be moved into the more bulky first rotational orientation again, preferably by means of a further rotation device.

A more bulky first rotational orientation is in particular a rotational orientation of a workpiece that takes the form of a vehicle body such that a workpiece longitudinal axis is oriented perpendicular to the conveying direction. A less bulky second rotational orientation is in particular a rotational orientation of a workpiece that takes the form of a vehicle body such that the workpiece longitudinal axis is oriented parallel to the conveying direction.

In particular for the purpose of passing through a constriction point, in particular a lock, a change in the rotational orientation may for example be provided by means of one or more rotation devices such that a rotation by 90° is performed once or twice or more than twice.

It may be favourable if the conveying device includes a lifting device by means of which the workpieces are liftable from a first level to a second level and/or are lowerable from the second level to the first level.

Further, it may be provided for the conveying device to include a transfer device by means of which the workpieces are transferable from one partial conveying line to a further partial conveying line, wherein the conveying directions in the two partial conveying lines are different from one another, and wherein a global rotational orientation of the workpieces in relation to the treatment installation is identical in both partial conveying lines.

By means of a transfer device of this kind, a local rotational orientation preferably varies in relation to the respective conveying direction in the partial conveying lines.

For example, a conveying direction that is rotated by 90° may be provided while maintaining a global rotational orientation in relation to the treatment installation.

For example, it may be provided for a lock to be passed through in a workpiece longitudinal direction in order to enable the width of a lock to be small. The actual conveying, in particular through a treatment chamber, is preferably performed transversely, in particular perpendicular, to the workpiece longitudinal direction.

In one embodiment of the invention, it may be provided for the conveying device to include a rotation device, by means of which a rotational orientation of the workpieces about a vertical axis of rotation is variable, and a lifting device, by means of which the workpieces are liftable from a first level to a second level and/or are lowerable from the second level to the first level, wherein the rotation device and the lifting device take the form of an integrated handling device for handling the workpieces between two partial conveying lines.

By means of the handling device it is thus possible to perform a rotation and/or a lifting or lowering of individual or a plurality of workpieces at the same time or alternatively successively.

The workpieces are preferably conveyable along a plurality of partial conveying lines by means of the conveying device, wherein the partial conveying lines preferably together form an overall conveying line.

At least two partial conveying lines are preferably connected to one another by means of a lifting device and/or a rotation device and/or a transfer device.

The present invention further relates to a method for treating workpieces, for example for drying coated vehicle bodies.

In this respect, the object of the invention is to provide a method by means of which an optimised workpiece treatment is performable.

According to the invention, this object is achieved by a method for treating workpieces, for example for drying coated vehicle bodies, wherein the method includes the following:
supplying workpieces to a treatment chamber of a treatment installation; and/or
guiding workpieces through the treatment chamber; and/or
removing workpieces from the treatment chamber.

Preferably, the method has individual or a plurality of the features and/or advantages described in conjunction with the treatment installation.

Further, the treatment installation preferably has individual or a plurality of the features and/or advantages described in conjunction with the method.

It may be favourable if the workpieces are conveyed through the treatment chamber, at least in certain regions, by means of a conveying device such that a longitudinal direction of the workpieces is oriented transversely, in particular substantially perpendicular, to the conveying direction.

It may be advantageous if gas is supplied to the treatment chamber by means of at least one inlet opening and gas is removed from the treatment chamber by means of at least one outlet opening, wherein the supply on the one hand and the removal on the other are preferably performed on mutually different sides of a vertical workpiece transverse centre plane and/or a diagonal plane.

The workpieces are preferably conveyed through the treatment chamber discontinuously and/or in clocked manner.

It may be favourable if the workpieces are stopped at one or more holding positions and a gas stream flows, in particular flushes, through them there.

In particular, it may be provided for the workpieces to be positioned at one or more holding positions in a predetermined relative position in relation to one or more inlet openings and/or one or more outlet openings in order in particular to enable a gas stream to flow through the workpieces in a targeted manner.

Preferably, gas supply to the treatment chamber and/or gas removal from the treatment chamber is performed continuously, in particular independently of a preferably discontinuous and/or clocked conveying of the workpieces. As a result of the discontinuous and/or clocked conveying of the workpieces, in particular stopping of the workpieces at one or more holding positions, a desired flow through the one or more workpieces may preferably be enabled, in particular without any risk of local overheating of the respective workpiece, despite the continuous gas stream.

However, it may also be provided for gas supply to the treatment chamber and/or gas removal from the treatment chamber to be performed discontinuously and/or in clocked manner, in which case conveying of the workpieces is then performed preferably continuously or discontinuously and/or in clocked manner.

In particular, it may be provided for a volumetric flow of the gas stream guided through the treatment chamber to be reduced and/or interrupted if one or more workpieces are moved and/or arranged in intermediate positions, in particular in undesired intermediate positions. As a result, preferably an optimised workpiece temperature control is achieved. Further, as a result preferably undesired turbulence can be reduced or entirely avoided, in particular in order to minimise or entirely prevent dust or other contaminants from being whirled up.

An intermediate position is for example a position of the workpiece within the treatment chamber that is between two successive treatment positions of the workpiece.

An intermediate position is in particular a position of the workpiece within the treatment chamber in which a regular and/or non-reduced supply of the gas stream would result in an undesired local overheating or cooling of the workpiece. For example, an intermediate position is a position of the workpieces in which a gas stream that is directed into the treatment chamber flows onto A pillars or C pillars of the workpieces or past the workpieces, instead of into an interior of the workpieces.

It may be advantageous if a gas stream flows, in particular flushes, through the workpieces at least in certain regions or at least partly in a workpiece longitudinal direction.

It may be favourable if at least approximately 35%, in particular at least approximately 50%, and/or at most approximately 90%, in particular at most approximately 80%, of the gas stream flowing through the treatment chamber flows through the workpieces.

Here, the gas stream may be in particular a heating gas stream for heating the workpieces and/or a flushing gas stream for flushing through the workpieces, in particular for removing solvent, and/or a cooling gas stream for cooling the workpieces.

Of the gas stream flowing through the treatment chamber, it may be provided for a partial gas stream, which flows through the workpieces, to flow into an interior of the respective workpiece through one or more entry openings and to flow out of the interior through one or more exit openings.

An entry opening is for example an opening for receiving a windscreen. A plurality of exit openings are then for example openings for rear side windows and/or rear windows and/or an opening for receiving a rear screen. For example, for this purpose there may be provided removal by suction, arranged at least approximately at mid-point and/or centrally below a vehicle rear.

Further, an entry opening is for example an opening for receiving a rear screen. A plurality of exit openings are then for example openings for front side windows and/or an opening for receiving a windscreen. For example, for this purpose there may be provided removal by suction, arranged at least approximately at mid-point and/or centrally below a vehicle front.

As an alternative or in addition to the features mentioned above, it may be provided for the treatment chamber to include at least one heating section in which the workpieces are heatable and/or are maintainable at a temperature higher than an ambient temperature.

In this description and the attached claims, the term "ambient temperature" should be understood to mean in particular a temperature in the environment around the treatment installation, for example a temperature in the factory, in particular approximately 10° C. to 40° C. or approximately 20° C. to 25° C.

It may be favourable if the treatment installation includes a flushing device for flushing a gas stream through a flushing section of the treatment chamber.

The gas stream is for example a fresh air stream and/or an exhaust gas stream from a cooling section and/or a heating section and/or an exhaust gas stream from a lock (isolating gas stream) of the treatment installation.

A fresh air stream is a gas stream of fresh air. Fresh air is in particular factory air in a factory in which the treatment installation is arranged, and/or outside air or ambient air from an environment around the treatment installation and/or the factory in which the treatment installation is arranged.

It may be provided for a gas stream to be guided through the treatment chamber multiple times, in particular to be supplied successively to different sections of the treatment chamber.

For example, a gas stream may be taken from a cooling zone and/or heating zone and/or holding zone of the treatment chamber and supplied to a lock. A gas stream removed from the lock is then suppliable to the flushing section of the treatment chamber for example as a flushing gas stream.

It may be provided for the flushing section of the treatment chamber to be arranged downstream of at least one heating section of the treatment chamber, as seen in the conveying direction.

In particular, it may be provided for the flushing section of the treatment chamber to be arranged directly after at least one heating section of the treatment chamber, as seen in the conveying direction.

It may be advantageous if the flushing section of the treatment chamber is arranged between at least two heating sections of the treatment chamber, as seen in the conveying direction.

The treatment chamber preferably includes at least one heating section, at least one cooling section for cooling the workpieces, and at least one flushing section.

At least one flushing section is preferably arranged between the at least one heating section and the at least one cooling section, as seen in the conveying direction.

It may be favourable if the heating section, the flushing section and/or the cooling section are selectively fluidically separable from one another and fluidically connectable to one another by means of one or more separating elements.

A separating element is in particular a mechanical separating element, for example a gate. Further, a separating element may for example be a separating element that operates by fluid mechanics, in particular an airlock.

It may be favourable if the treatment installation includes a gas guide arrangement by means of which the gas stream that is supplied to a flushing section of the treatment chamber is suppliable, after it has flowed through the flushing section, to at least one heating section of the treatment chamber.

In particular, the gas stream that is supplied to a flushing section of the treatment chamber may be suppliable, after it has flowed through the flushing section, to a plurality of heating sections of the treatment chamber, in particular two heating sections.

Here, the gas stream is preferably divisible after it has flowed through the flushing section, with the result that a respective partial gas stream is suppliable to the respective heating section of the treatment chamber.

It may be advantageous if the gas stream that is supplied to a flushing section of the treatment chamber is suppliable, after it has flowed through the flushing section, to at least one heating section of the treatment chamber at an end of the heating section that is facing away from a flushing section.

For example, it may be provided for the gas stream that is supplied to a flushing section of the treatment chamber to be suppliable, after it has flowed through the flushing section, to two or more heating sections of the treatment chamber at the end of the respective heating section that is facing away from the flushing section. The gas stream then flows through the respective heating section preferably from an end of the heating section that is facing away from the flushing section to an end of the heating section that faces the flushing section.

It may be advantageous if the treatment installation includes a flushing device by means of which a heated gas stream is suppliable to a flushing section of the treatment chamber. The term "heated gas stream" here should be understood to mean in particular a gas stream having a temperature higher than the ambient temperature.

For example, a heated gas stream may be a gas stream removed from a cooling section of the treatment installation.

As an alternative or in addition thereto, it may be provided for the treatment installation, in particular the flushing device, for example a flushing module, to include a heating device for heating the gas stream. The heating device may for example include an exhaust gas cleaning device, in particular a regenerative thermal oxidation plant. Further, exhaust heat from the treatment installation may be utilised to heat the gas stream.

It may be favourable if a heating section includes at least one heating zone for heating up the workpieces and/or at least one holding zone in which an elevated temperature of the workpieces is maintainable.

Preferably, each heating zone and/or each holding zone includes one or more circulating air modules for circulation of the gas stream that is guided in the respective heating zone and/or holding zone.

In particular, a heating section includes a plurality of heating zones and/or a plurality of holding zones, which each preferably include one or more circulating air modules.

It may be provided for a heating section to include at least one heating zone for heating up the workpieces and/or at least one holding zone in which an elevated temperature of the workpieces is maintainable, wherein preferably each heating zone and/or each holding zone includes a separate heating device and/or a separate heat exchanger for heating the gas stream that is guided in the respective heating zone and/or holding zone.

It may be favourable if the treatment installation includes at least one heating section, at least one flushing section and at least one cooling section, wherein the at least one heating section and/or the at least one flushing section are arranged above the at least one cooling section in relation to the direction of gravity.

It may be favourable if a heating section and/or a flushing section of the treatment installation are arranged entirely above the cooling section.

The treatment installation may for example include a lifting device by means of which the workpieces are liftable to a level of the heating section and/or the flushing section and/or are lowerable to a level of the cooling section.

The lifting device may for example form or include a lock and/or a flushing section of the treatment installation. A lock chamber or flushing chamber that is separable from the heating section and/or the cooling section is then preferably delimited and/or sealed by a base plate of the lifting device and/or a lateral dividing wall. The lateral dividing wall preferably separates the lock chamber from the heating section. The base plate preferably separates the lock chamber from the cooling section.

In one embodiment of the invention, it may be provided for the treatment installation to include at least one gas supply by means of which a gas stream is directable at least approximately perpendicular to an entry plane of an entry opening in a workpiece and into an interior of the workpiece.

The entry opening is in particular an access to the interior, for example an opening in a workpiece taking the form of a vehicle body, wherein the opening serves for example to receive a windscreen or rear screen.

The workpieces are preferably receivable by means of the conveying device and conveyable through at least one heating section, at least one flushing section and/or at least one cooling section of the treatment chamber such that a longitudinal direction of the workpieces is oriented transversely, in particular substantially perpendicular, to the conveying direction.

In particular, a vehicle longitudinal axis of workpieces that take the form of vehicle bodies is oriented transversely, preferably perpendicular, to the conveying direction.

The treatment installation is preferably a drying installation for drying vehicle bodies.

In particular for enabling energy-efficient operation of the treatment installation, it may be provided for an exhaust gas stream from a cooling section of the treatment installation to be used as the flushing gas stream. As a result, a heated flushing gas stream can be provided in an energy-efficient manner, since the gas guided through the cooling section takes up heat from the workpieces to be cooled.

A lock (gas lock) is preferably a section of the treatment installation that is different from a flushing section.

An isolating gas stream preferably flows through a lock.

The isolating gas stream flows through the lock preferably at least approximately in the direction of gravity from top to bottom, or from bottom to top.

The isolating gas stream preferably forms an angle of at least approximately 30°, in particular at least approximately 40°, for example approximately 50°, with the horizontal. As an alternative or in addition thereto, it may be provided for the isolating gas stream preferably to form an angle of approximately 90°, in particular at most approximately 75°, for example at most approximately 60°, with the horizontal.

The isolating gas stream is removed and/or sucked away from the lock, preferably in a base section of the lock.

Preferably, an isolating gas stream that is guided through the lock is re-used after it has flowed through the lock, in particular being supplied to a flushing section of the treatment installation as a flushing gas stream.

In one embodiment of the invention, it may be provided for an isolating gas stream for a lock to be supplied to the workpieces, after it has flowed through the lock, as a flushing gas stream and to be guided through them.

The flushing gas stream that is supplied to the workpieces preferably includes a content of at least approximately 30%, in particular at least approximately 40%, for example at least approximately 50%, of isolating gas of the isolating gas stream.

Further, it may be provided for the flushing gas stream that is supplied to the workpieces to include a content of preferably at most approximately 80%, in particular at most approximately 70%, of isolating gas of the isolating gas stream. The isolating gas stream is preferably at least partly or entirely a stream of fresh air and/or a gas stream that is removed from a heating section or cooling section of the treatment installation.

The workpieces are preferably first guided through at least one heating section of the treatment chamber and then flushed with a flushing gas stream. After the flushing, the workpieces are preferably supplied to at least one further heating section of the treatment chamber and/or at least one cooling section of the treatment chamber.

For example, it may be provided, after the flushing, for the workpieces first to be supplied to a further heating section and then to a cooling section, or alternatively to the cooling section directly after the flushing.

In one embodiment of the invention, it may be provided for a flushing section and at least one heating section and/or at least one cooling section to be fluidically separated from one another by means of one or more separating elements in order to perform a flushing procedure.

In particular, in this case a clocked operation of a flushing device and/or the conveying device is provided such that the workpieces are preferably suppliable to the flushing section successively, individually or in discrete groups.

It may be advantageous if a gas stream, in particular a heated gas stream (hot gas stream), a flushing gas stream and/or a cooling gas stream is directed in a direction running substantially perpendicular to an entry opening in a workpiece and into an interior of the workpiece.

By means of the flushing device, preferably a workpiece interior, in particular a body interior, is flushable. Preferably, as a result of this, solvent escaping from a workpiece and/or other readily volatile coating components, sealing components and/or adhesive components are removable from the workpiece interior.

Preferably, workpieces of different types and/or sizes can be conveyed through the treatment chamber by means of the conveying device.

At least one inlet opening for supplying gas to the treatment chamber preferably includes a nozzle or is formed by a nozzle.

It may be favourable if at least one inlet opening for supplying gas to the treatment chamber includes a jet nozzle or is formed by a jet nozzle.

A jet nozzle preferably includes a nozzle inlet and a nozzle outlet, wherein the nozzle outlet preferably has a larger cross sectional surface than the nozzle inlet, and/or wherein preferably a continuously divergent, in particular continuously increasingly divergent, gas guiding section is provided between the nozzle inlet and the nozzle outlet.

It may be advantageous if the jet nozzle includes a flow shaping element, for example in the form of a central body.

The central body is arranged in the region of the nozzle outlet of the nozzle, preferably centrally in relation to a plane oriented perpendicular to the direction of flow in the nozzle.

For example, the central body is substantially conical and takes a form that widens in the direction of flow.

The nozzle and/or the central body are preferably formed and/or arranged to be rotationally symmetrical about a common axis of rotation.

Further preferred features of a jet nozzle are mentioned for example in WO 2014/063797 A1, whereof the entirety of the description is incorporated into the present invention by reference.

A nozzle may have a cross sectional shape that is for example rectangular, round, oval or elongate.

Preferably, the nozzle is arranged to be movable in respect of its position and/or orientation on a wall, in particular a dividing wall, side wall, base wall and/or top wall, of a housing that delimits the treatment chamber. For example, planar sheets and/or slots may be provided in the respective wall in order that the position and/or orientation of the at least one nozzle can be adjusted.

It may be favourable if one or more inlet openings are closable by means of cover elements, in particular flaps.

Preferably, more uniform heating and/or cooling of the workpieces is produced by turbulent flow in the respective workpiece interior.

It may be favourable if any action of the hot gas stream on delicate workpiece regions, for example regions of thin sheet (in particular in the roof region of a vehicle body), is avoided or at least reduced.

Preferably, reduced flow against the conveying device is produced, as a result of which it is possible for less dirt to be discharged from a conveyor chain of the conveying device or another conveying element of the conveying device.

It may be favourable if a flow path between the at least one inlet opening and the at least one outlet opening is shortened, as a result of which a better drying equilibrium can be produced.

As a result of a targeted local removal by suction (removing the gas stream through one or more outlet openings), preferably locally increased flow rates can be obtained in order to achieve a preferred level of flow against the workpieces.

The flushing device and/or a lock may for example include one or more separating elements that are formed by a hinged gate, a roll-up gate or a lifting gate. Here, it may be provided for a respective separating element to be arranged upstream and/or downstream of the workpiece that is to be treated, as seen in the conveying direction, in order to enclose the workpiece during the flushing procedure and/or the passage through the lock.

In one embodiment of the invention, it may be provided for a mechanical separation (mechanical separating element) of the heating section to be dispensed with. For example, a final module, which forms a heating zone or holding zone, takes the form of a flushing module. A flushing module of this kind is in particular operable in a fresh air/exhaust air operation.

A gas in a cooling section of the treatment device is preferably solvent-free. An exhaust gas stream that is removed from the cooling section is thus preferably reusable in the treatment installation, for example as a gas stream to be supplied to a heating section and/or flushing section.

It may be favourable if the conveying device includes a chain conveyor.

A conveyor chain is preferably integrated in a base of the housing that surrounds the treatment chamber, in particular being let into it.

The workpieces are for example arranged and/or received on the conveying device by means of a respective skid.

It may be favourable if a skid for receiving one or more workpieces is arrangeable on the conveying device and conveyable by means thereof such that longitudinal axes of skid runners of the skid are oriented substantially parallel to the conveying direction.

As an alternative thereto, it may further be provided for a skid for receiving one or more workpieces to be arrangeable on the conveying device and conveyable by means thereof such that longitudinal axes of skid runners of the skid are oriented transversely, in particular substantially perpendicular, to the conveying direction.

It may be favourable if one or more workpieces are arrangeable on a skid and receivable on the conveying device by means of the skid and/or are conveyable by means of the conveying device such that a workpiece longitudinal axis is oriented parallel or transversely, in particular substantially perpendicular, to longitudinal axes of skid runners of the skid and/or parallel or transversely, in particular substantially perpendicular, to the conveying direction.

A lower edge of a skid is preferably located on or just above a base level of the treatment chamber.

It may be favourable if the conveying device is a combination of a skid conveying device and a conveying device without skids.

However, it is also possible to provide solely a skid conveying device or a conveying device without skids.

If both a skid conveying device and a conveying device without skids are provided, it may be provided for the treatment installation to include a transfer device for transferring the workpieces from a skid onto a conveying device without skids.

It may be favourable if the treatment installation includes one or more dummy modules that form sections of the treatment chamber but are not heated and are not provided with inlet openings or outlet openings. As a result, in particular a more uniform application of the heat is achievable.

In one embodiment of the invention, it may be provided for the treatment installation to include a centralised or higher-level heating device.

In particular, it may be provided for a plurality of circulating air devices and/or flushing gas devices to be thermally coupled to the heating device. For example, a hot gas line may be provided by means of which hot gas (heated gas) is suppliable from the heating device to the circulating air devices and/or flushing gas devices.

One or more circulating air devices and/or one or more flushing gas devices preferably each include one or more heat exchangers to which there is suppliable on the one hand a gas stream to be supplied to the treatment chamber and on the other a hot gas stream, in particular a hot gas stream coming from the heating device.

By means of the one or more heat exchangers, a gas stream to be supplied to the treatment chamber is preferably heatable indirectly.

The heating device may for example be a thermal exhaust gas cleaning device, in particular for cleaning exhaust gas removed from the treatment chamber.

Preferably, a desired heating effect may be established in a targeted manner, in particular controlled and/or regulated, in the individual circulating air devices and/or flushing gas devices by suitable valves and/or flaps.

The treatment installation preferably further includes the following:
a treatment chamber that includes a plurality of treatment chamber sections, each of which is associated with one of a plurality of separate circulating air modules of the treatment installation;
a heating installation that preferably includes a self-contained heating gas guide arrangement, wherein a plurality of circulating air modules are coupled to the heating gas guide arrangement, in particular for the purpose of heating the gas guided through the treatment chamber sections.

Because the treatment installation preferably includes a heating installation having a self-contained heating gas guide arrangement that is coupled to the circulating air modules, the gas to be supplied to the treatment chamber sections is heatable simply and efficiently. As a result, the treatment installation may preferably be operated in a particularly energy-efficient manner.

The heating gas guide arrangement preferably takes the form of a closed ring, with the result that at least a partial gas stream of a heating gas stream that is guided in the heating gas guide arrangement flows through the heating gas guide arrangement multiple times.

The heating gas is preferably untreated gas and/or clean gas that is suitable and/or provided for use in the treatment chamber, that is to say for flowing through the treatment chamber.

At least directly upstream of the treatment chamber sections, the heating gas is preferably at a temperature that is higher than that of the gas stream in the circulating air modules and/or treatment chamber sections.

Preferably, the heating gas is not an exhaust gas of a heating device of the heating installation, and in particular is not combustion exhaust gas.

The term "self-contained heating gas guide arrangement" should be understood to mean in particular a heating gas guide arrangement in which at least some of the heating gas stream is guided in a circuit. Independently thereof, it is preferably possible even with a self-contained heating gas guide arrangement for a continuous or phased supply of fresh gas to be provided to the heating gas stream and/or for heating gas to be removed from the heating gas stream.

It may be favourable if a supply of fresh gas and a removal of heating gas, that is to say an exchange of heating gas, are preferably of a size such that, on a single pass of the heating gas stream through the heating gas guide arrangement, at least 40%, preferably at least approximately 50%, in particular at least approximately 80%, for example at least approximately 90%, of the heating gas stream that passes a particular point on the heating gas guide arrangement returns to this point again after the pass is complete.

The supply of fresh gas and/or the removal of heating gas from the heating gas stream is preferably performed exclusively in the treatment chamber sections and/or the circulating air modules of the treatment installation.

However, it may also be provided for a fresh gas supply and/or an exhaust gas removal arrangement to be associated with the heating installation and, by means of these, for fresh gas to be supplied and heating gas to be removed from the heating gas stream in an area outside the treatment chamber sections and/or outside the circulating air modules.

The circulating air modules and/or the treatment chamber sections are preferably a constituent part of the heating gas guide arrangement.

In particular, the heating gas is at least in part preferably guidable through the treatment chamber sections multiple times before it (again) flows through the part of the heating gas guide arrangement that is located outside the circulating air modules and/or outside the treatment chamber sections.

In one embodiment of the invention, it may be provided for the heating gas guide arrangement to include a circulating air guide that in certain regions is formed by a plurality of parallel circulating air modules and/or treatment chamber sections.

Preferably, a gas stream is guidable in the circulating air modules and/or treatment chamber sections in a circulating air circuit to which heating gas is suppliable from the heating gas guide arrangement. Preferably, a partial gas stream of the gas stream of each circulating air module and/or treatment chamber section that is guided in the circuit is removable from the circulating air module and/or treatment chamber section, is guidable in a closed circuit by means of the heating gas guide arrangement, and finally is suppliable again, as part of the heating gas stream, to one or more circulating air modules and/or treatment chamber sections.

A supply of heat to the individual circulating air devices and/or flushing gas devices may preferably be direct, in particular through the direct supply of heating gas, or indirect, in particular by the transfer of heat from a heating gas or hot gas to the gas stream to be supplied to the treatment chamber.

The heating gas may be coupled thermally, for example by means of a heat exchanger, to a hot gas of the heating device, in particular an exhaust gas of the heating device, in order to transfer heat from the hot gas, in particular the exhaust gas of the heating device, to the heating gas.

Further preferred features and/or advantages of the invention form the subject matter of the description below and the illustrative representation of exemplary embodiments.

BRIEF DESCRIPTION OF THE DRAWINGS

Like or functionally equivalent elements are provided with the same reference numerals in all the Figures.

DETAILED DESCRIPTION OF THE INVENTION

Figure 1:
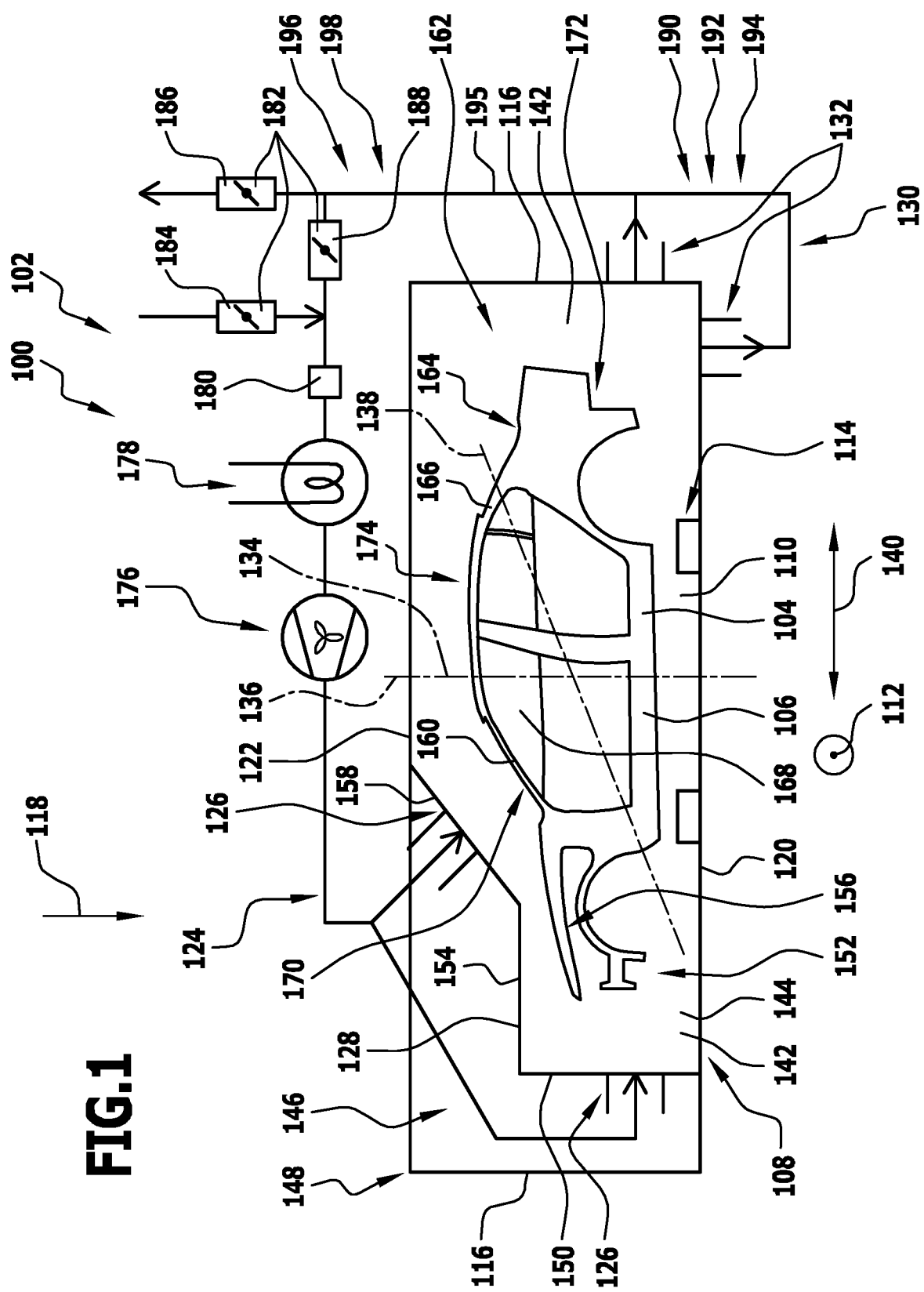
FIG. 1 shows a schematic illustration of the mode of operation of a first embodiment of a treatment installation for treating workpieces.
Figure 2:
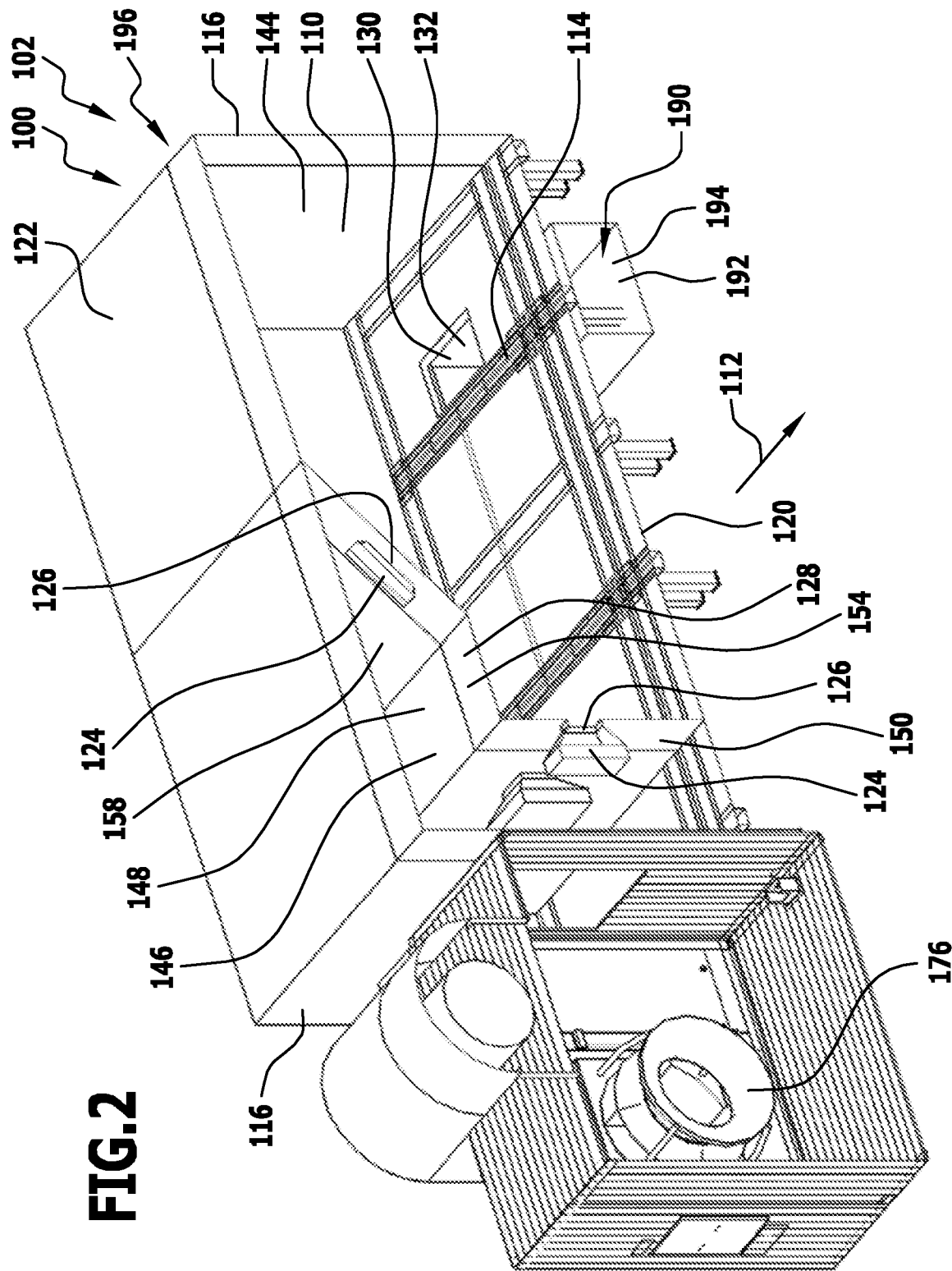
FIG. 2 shows a schematic perspective illustration, partly in section, of a second embodiment of a treatment installation.
Figure 3:
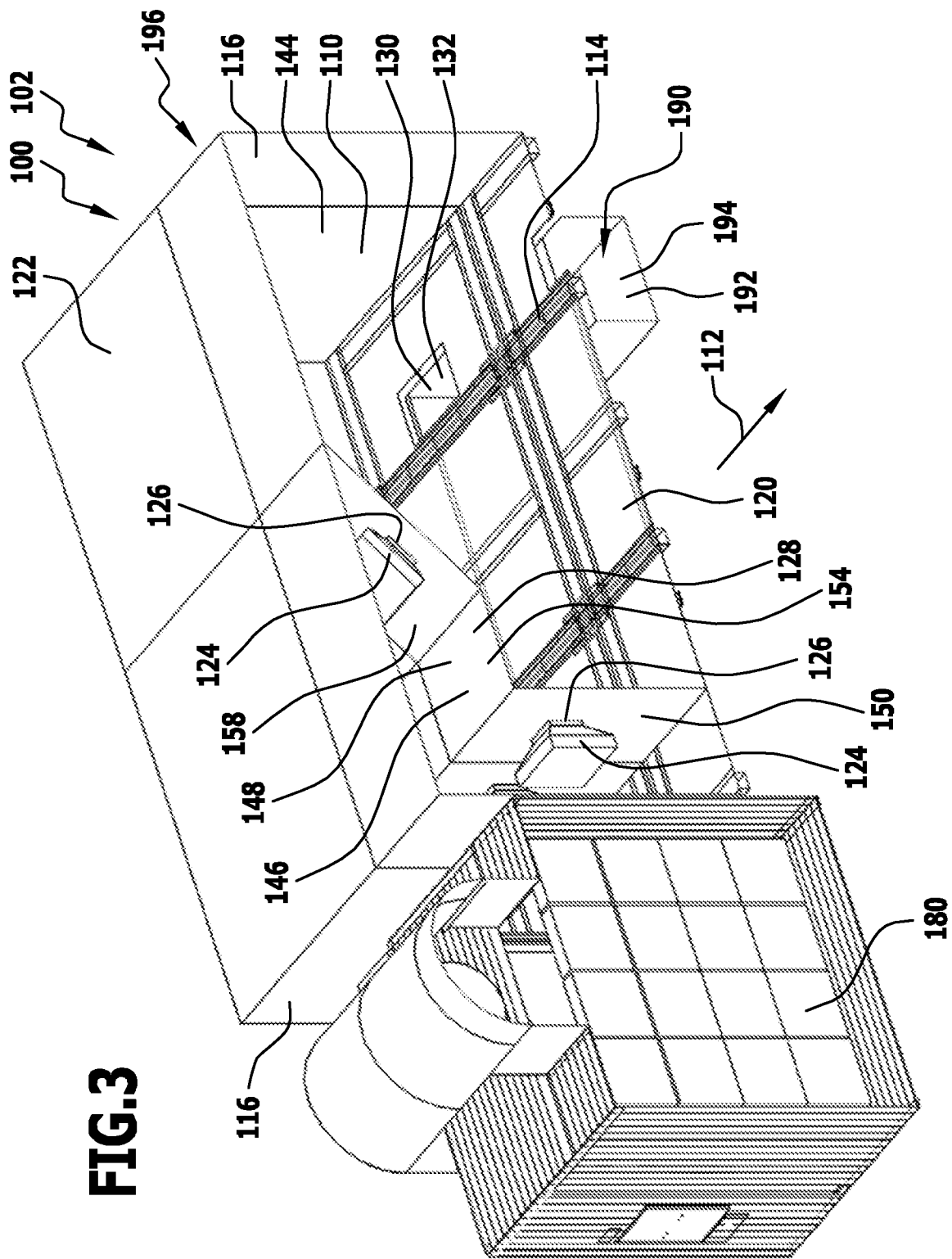
FIG. 3 shows a further schematic perspective sectional illustration of the treatment installation from FIG. 2.
Figure 4:
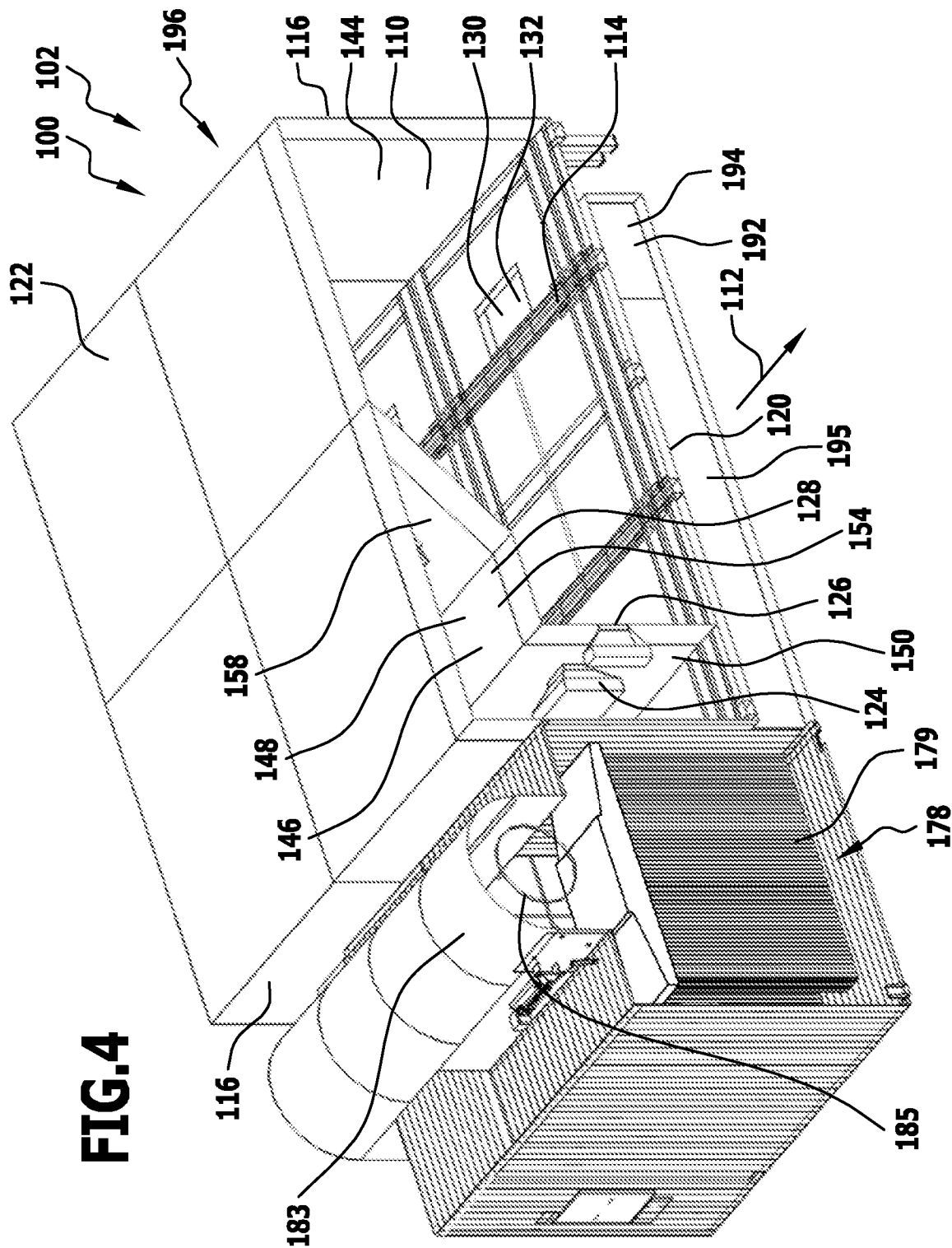
FIG. 4 shows a further schematic perspective sectional illustration of the treatment installation from FIG. 2.
Figure 5:
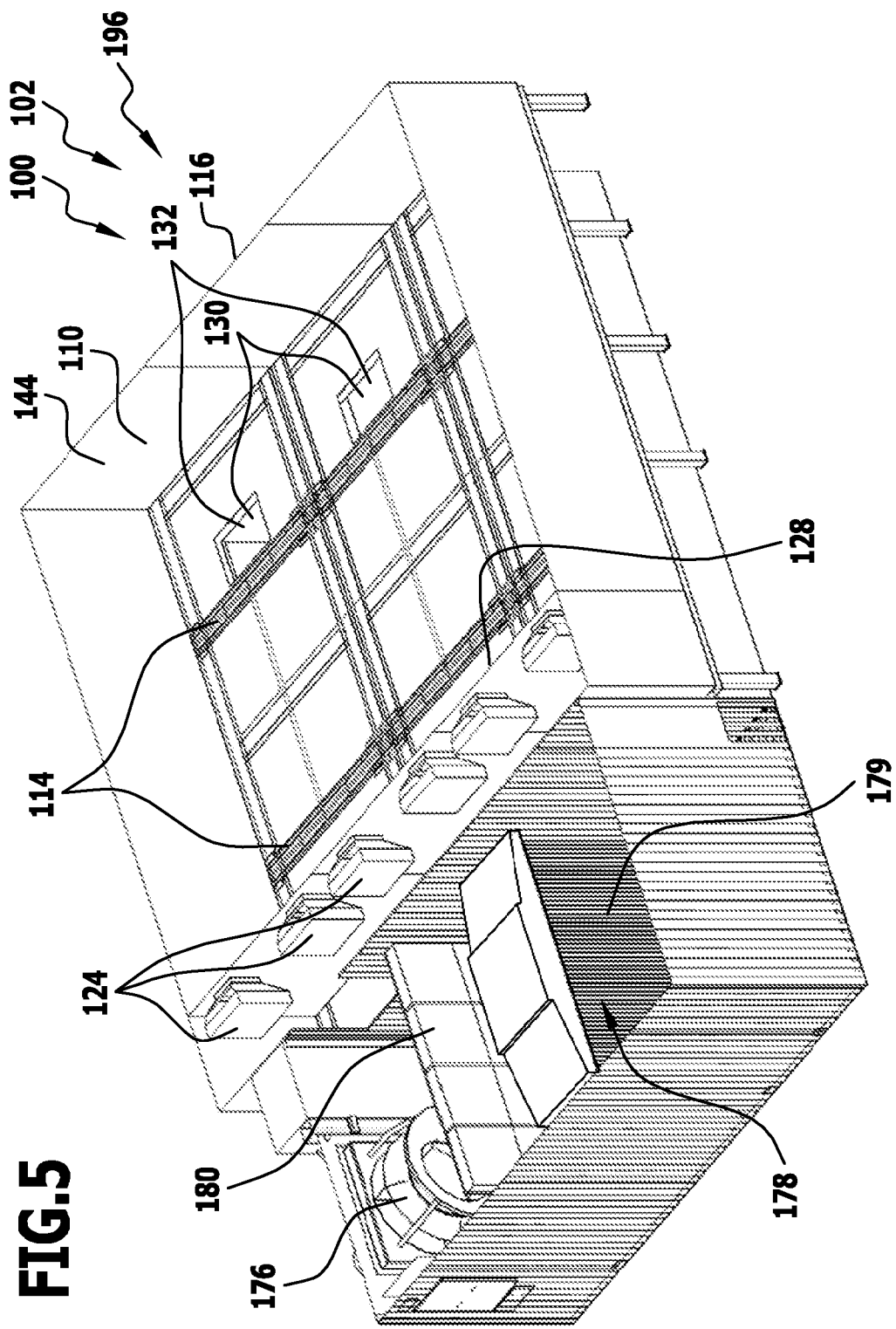
FIG. 5 shows a horizontal section through the treatment installation from FIG. 2.
Figure 6:
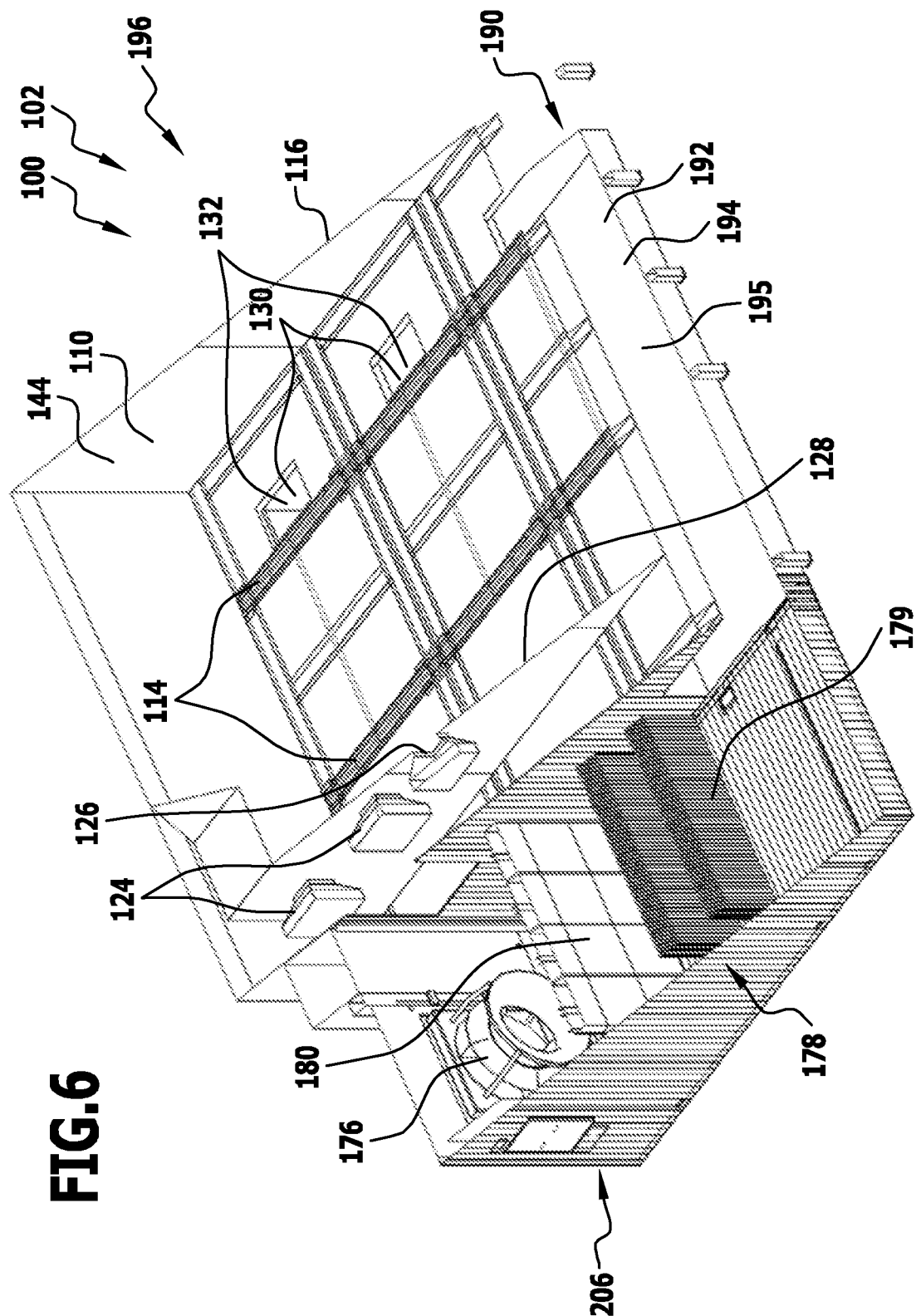
FIG. 6 shows an oblique section through the treatment installation from FIG. 2.

An embodiment that is illustrated in FIG. 1, of a treatment installation that is designated 100 as a whole, is for example a drying installation 102 for drying coated workpieces 104.

The workpieces 104 are for example vehicle bodies 106. The coating is for example a paint.

The treatment installation 100 includes a housing 108 that surrounds a treatment chamber 110.

The treatment chamber 110 serves to receive one or more workpieces 104.

In particular, the workpieces 104 are conveyable through the treatment chamber 110 in a conveying direction 112.

For this purpose, the treatment installation 100 includes in particular a conveying device 114, for example a chain conveyor.

The workpieces 104 are arrangeable on the conveying device 114 and movable in the conveying direction 112 thereby, preferably by means of a skid or alternatively without skids.

The housing 108 includes two side walls 116 that are lateral as seen in the conveying direction 112, a base wall 120 that is arranged at the bottom in relation to the direction 118 of gravity, and a top wall 122 that is arranged at the top in relation to the direction 118 of gravity.

The housing 108 in particular takes a substantially cuboid form.

For efficient treatment of the workpiece 104, a gas stream is preferably suppliable to the treatment chamber 110.

For this purpose, the treatment installation 100 includes a gas supply 124.

The gas supply 124 preferably includes a plurality of inlet openings 126, which are arranged for example in a side wall 116 or a dividing wall 128 of the housing 108, this dividing wall 128 to be explained below.

Further, the treatment installation 100 preferably includes a gas removal arrangement 130, which in particular includes a plurality of outlet openings 132.

The outlet openings 132 may for example be arranged in a side wall 116 and/or in the base wall 120.

In further embodiments, the inlet openings 126 and the outlet openings 132 may also be in other positions, however. For example, it is also possible to arrange inlet openings 126 and/or outlet openings 132 in the top wall 122.

For the purpose of optimum flow of the gas stream through the workpieces 104, the inlet openings 126 on the one hand and the outlet openings 132 on the other are preferably arranged on mutually opposing sides of the workpiece 104.

In particular, the inlet openings 126 on the one hand and the outlet openings 132 on the other are arranged on mutually opposing sides of a workpiece transverse centre plane 134, a vertical longitudinal centre plane 136 of the treatment chamber 110 and/or a diagonal plane 138 of the treatment chamber 110.

The workpiece transverse centre plane 134 is in particular a plane that is oriented perpendicular to a workpiece longitudinal direction 140 and runs through a geometric centre point, arranged at mid-point as seen in the workpiece longitudinal direction 140, or centre of gravity of the workpiece 104.

The workpiece longitudinal direction 140 is in this case in particular a longitudinal direction of the vehicle in which a vehicle that includes the vehicle body 106 moves when it is travelling forward in a straight line.

The vertical longitudinal centre plane 136 of the treatment chamber 110 is preferably a plane that runs parallel to the conveying direction 112 and in the direction 118 of gravity. Thus, the vertical longitudinal centre plane 136 intersects the treatment chamber 110, preferably creating two semi-chambers 142 of the same size. As an alternative or in addition thereto, it may be provided for the vertical longitudinal centre plane 136 to run through a geometric centre of the treatment chamber 110, in particular in relation to a maximum or average horizontal transverse extent of the treatment chamber 110 in a direction running horizontally and perpendicular to the conveying direction 112.

The treatment installation 100 preferably includes a housing 108 whereof the interior 144 is divided into two. In particular, the interior 144 is divided by means of the dividing wall 128 into on the one hand the treatment chamber 110 and on the other a distributor chamber 146 of a distributor device 148 of the treatment installation 100.

Here, the dividing wall 128 preferably runs parallel to the conveying direction 112 and is preferably adapted, at least in certain regions, to a contour of the workpiece 104.

In particular, the dividing wall 128 includes a vertical section 150, which extends in the vertical direction 118 in front of a vehicle front 152 of the workpiece 104 that takes the form of a vehicle body 106.

As an alternative or in addition thereto, it may be provided for the dividing wall 128 to include a horizontal section 154, which extends substantially horizontally and at least approximately along a front hood 156 of the workpiece 104 that takes the form of a vehicle body 106.

Further, as an alternative or in addition thereto, it may be provided for the dividing wall 128 to include an oblique section 158, which is oriented obliquely to the direction 118 of gravity and runs at least approximately parallel to an A pillar 160 of the workpiece 104 that takes the form of a vehicle body 106.

In an alternative embodiment of the treatment installation 100, a dividing wall 128 may further be provided such that it is adapted to the contour of a vehicle rear 162 of the workpiece 104 that takes the form of a vehicle body 106.

In particular, the vertical section 150 of the dividing wall 128 in that case runs in the vertical direction along the vehicle rear 162.

Further, it may in that case be provided for the horizontal section 154 of the dividing wall 128 to extend at least approximately along a rear hood 164 of the workpiece 104 that takes the form of a vehicle body 106.

Moreover, it may be provided for the oblique section 158 of the dividing wall 128 in that case to run substantially parallel to a C pillar 166 of the workpiece 104 that takes the form of a vehicle body 106.

By means of the gas supply 124 and the gas removal arrangement 130, a gas stream is flowable through the treatment chamber 110, preferably substantially diagonally and transversely, in particular perpendicular, to the conveying direction 112.

The inlet openings 126 and the outlet openings 132 are in this case preferably arranged such that the gas stream flows through a workpiece interior 168 preferably at least in certain regions in the workpiece longitudinal direction 140.

For this purpose, in particular an inlet opening 126 is provided in the oblique section 158 of the dividing wall 128 such that the gas stream flowing through this inlet opening 126 and into the treatment chamber 110 is directed into an entry opening 170 in the workpiece 104.

The entry opening 170 is in particular an opening arranged between two A pillars 160 of the workpiece 104 that takes the form of a vehicle body 106, for the arrangement of a front screen.

As an alternative thereto, it is also possible to provide an entry opening 170 between two C pillars 166 and/or D pillars (not illustrated).

Thus, in particular a gas stream is directable by means of the inlet openings 126 directly into the workpiece interior 168.

One or more inlet openings 126 arranged in the vertical section 150 preferably serve to supply the gas stream to the vehicle front 152 in a substantially horizontal direction.

One or more exit openings 172 of the workpiece 104 are preferably arranged in the region of the vehicle rear 162.

Preferably, the one or more outlet openings 132 are arranged in the regions of the side wall 116 and/or base wall 120 close to the vehicle rear 162 in order to be able to remove a gas stream from the workpiece 104 in a targeted manner, through the one or more exit openings 172.

A gas stream is thus flowable from the front to the rear through the workpiece 104, in particular the vehicle body 106, preferably in the workpiece longitudinal direction 140.

As an alternative, however, through flow may also be provided in the opposite direction.

As a result of the selected flow through the workpiece 104, it is preferably possible to avoid the workpiece 104, in particular the vehicle body 106, being heated to an undesirably great extent in a roof region 174. Moreover, as a result of this it is preferably possible to achieve uniform heat supply to the workpiece 104.

The actual supply of heat is in particular performed by the transfer of heat from the supplied gas stream to the workpiece 104.

Thus, the gas stream is in particular a heated gas stream when it is supplied to the treatment chamber 110 through the inlet openings 126.

For the purpose of providing the gas stream, the treatment installation 100 preferably includes a fan device 176, a heating device 178, a separation device 180 and/or one or more valves 182.

In particular, the gas stream is drivable by means of the fan device 176.

The gas stream is preferably heatable directly or indirectly by means of the heating device 178. The heating device 178 may in particular include a thermal exhaust gas cleaning device, a regenerative thermal oxidation device, an auxiliary burner, a micro gas turbine and/or another type of combustion device.

The separation device 180 preferably serves to remove contaminants from the gas stream, in particular in order to avoid an undesired action by contaminants on the coated workpiece 104.

The separation device 180 is for example a filter device.

The one or more valves 182 preferably serve selectively to supply fresh air, to remove exhaust air and/or to guide the complete or partial circulation of air.

In this description and the attached claims, the term "air" is not necessarily used to designate the oxygen/nitrogen mixture in the atmosphere. Rather, and in an entirely general manner, any desired gas may be provided. In particular, the term "circulating air" preferably merely designates guiding a gas stream in a closed circuit.

Preferably, the treatment installation 100 includes a valve 182 that takes the form of a supply valve 184.

Preferably, a fresh air stream can be supplied by means of the supply valve 184.

Further, preferably a removal valve 186 may be provided. By means of the removal valve 186, in particular the gas stream is removable and/or dischargeable to the environment.

By means of a valve 182 that takes the form of a circulating air valve 188, the gas stream may preferably be guided in a circuit. In particular, a predetermined quantity of gas is then guidable through the treatment chamber 110 multiple times.

By positioning the valves 182 suitably, it is further possible to provide a regular gas supply and regular gas removal in order always to replace at least some of the gas guided through the treatment chamber 110. In particular, this can have the effect of preventing an undesirably high concentration of pollutants.

An efficient gas supply is in particular possible if the partial gas streams that are removed through the outlet openings 132 are merged for example by means of a collecting device 190, in particular a collecting duct 192, and are then forwarded together.

The collecting duct 192 may in particular also be a removal duct 194.

By means of a return duct 195, the merged partial gas streams are preferably forwardable together, in particular being suppliable to the removal valve 186 and dischargeable to the environment or, in particular by way of the fan device 176, suppliable to the treatment chamber 110 again.

In particular if the valves 182 are adjusted such that at least a large proportion of the gas stream that is guided through the treatment chamber 110 is guided in a circulating air circuit, the part of the treatment installation 100 that is illustrated in FIG. 1 is a circulating air module 196.

If, by contrast, substantially exclusively fresh air or fresh gas is supplied to the treatment chamber 110, then the part of the treatment installation 100 that is illustrated in FIG. 1 is preferably a flushing module 198.

The treatment installation 100 that is illustrated in FIG. 1 functions in particular as follows:

By means of the fan device 176, a gas stream is introduced into the distributor chamber 146 and is there supplied to the inlet openings 126.

The gas stream then passes through the inlet openings 126 and into the treatment chamber 110.

The inlet openings 126 are for example arranged and/or take a form such that the gas stream can flow, for example in the form of a plurality of partial gas streams, in a targeted manner into the workpiece interior 168 of the workpiece 104.

The gas stream then flows through the workpiece interior 168, at least approximately in the workpiece longitudinal direction 140, and is then removed from the treatment chamber 110 through the outlet openings 132.

As a result of a flow of this kind through the workpieces 104, it is made possible in particular for heat to be transferred uniformly from the gas stream to the one or more workpieces 104. Preferably, as a result overheated regions and excessively cool regions of the respective workpiece 104 can be avoided.

As can be seen from FIG. 1, the workpieces 104 are guided through the treatment chamber 110 in the conveying direction 112, in particular such that the workpiece longitudinal direction 140 is oriented perpendicular to the conveying direction 112.

Preferably here, a clocked conveying of the workpieces 104 is provided, with the result that they are stopped at regular intervals in preferred holding positions in relation to the inlet openings 126 and outlet openings 132.

In particular in the case of a gas stream that is maintained continuously, this can ensure the preferred flow or flushing through the workpieces 104.

A second embodiment of a treatment installation 100, illustrated in FIGS. 2 to 10, substantially corresponds, as regards its structure and functioning, to the treatment installation 100 according to the first embodiment, which is illustrated in FIG. 1.

Figure 7:
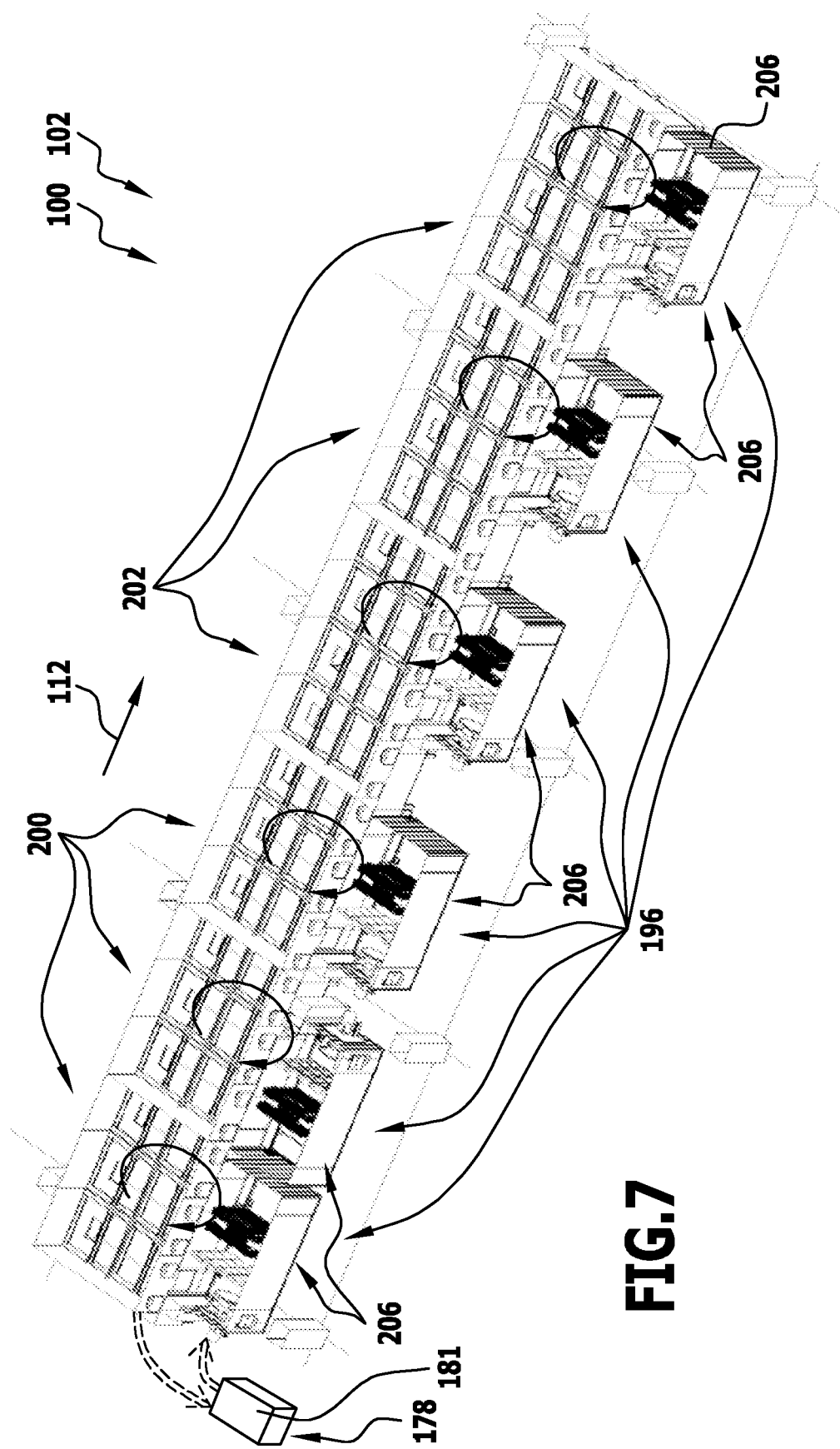
FIG. 7 shows a horizontal section through a plurality of modules of the treatment installation from FIG. 2.

As can be seen in particular from FIG. 7, the treatment installation 100 includes a plurality of modules, for example circulating air modules 196, which are arranged such that they succeed one another in the conveying direction 112.

Here, for example three circulating air modules 196 are provided, each of which forms a heating zone 200 of the treatment chamber 110. For example three further circulating air modules 196 form for example three holding zones 202 of the treatment chamber 110. Further, cooling zones (not illustrated) may be formed by further circulating air modules 196.

A heating zone 200 serves in particular to supply heat to the workpiece 104 such that the latter is heated.

Heat is preferably supplied in the holding zone 202 such that an already prevailing temperature of the workpiece 104 is kept constant.

The heating zones 200 and the holding zones 202 together preferably form a heating section 204 of the treatment chamber 110.

Preferably, a large part of the procedure for converting the coating on the workpiece 104 to a condition in which the coating is stable over the long term takes place in this heating section 204. In particular, this comprises a curing of paint and/or an evaporation of solvents.

As can be seen from FIG. 7, each module, in particular each circulating air module 196, preferably includes a separate circulating air device 206 for driving a circulating air gas stream in the respective circulating air module 196.

Each circulating air device 206 preferably includes a fan device 176, a heating device 178, a separation device 180 and/or one or more valves 182, in particular a supply valve 184, a removal valve 186 and/or a circulating air valve 188.

The circulating air device 206 is in particular docked onto a side wall 116 of the housing 108 of the treatment installation 100, in particular of the respective circulating air module 196. In this case, a side wall 116 of the housing 108 preferably at the same time forms a side wall 116 of the respective circulating air device 206. Preferably, simple through openings in the side wall 116 are in that case sufficient to make a fluid connection between the respective circulating air device 206 and the associated section of the treatment chamber 110 and/or the respective distributor chamber 146.

As a result of using a plurality of modules, in particular circulating air modules 196, and/or a plurality of separate circulating air devices 206, it is preferably possible to enable a simple modular structure for the treatment installation 100. Further, this preferably makes efficient operation of the treatment installation 100 possible.

As can be seen in particular from FIGS. 4 to 7, the heating device 178 may for example be a centralised heating device 178, in which a plurality of heat exchangers 179 serve for heat transfer in the individual circulating air modules 196, while the actual heat generation (heating power) takes place in a centralised heating device 178, for example a thermal exhaust gas cleaning device 181.

In that case, the circulating air devices 206 are connected to one another and to the thermal exhaust gas cleaning device 181 for example by means of a hot gas line 183 (see FIG. 4), with the result that hot gas generated in the thermal exhaust gas cleaning device 181 is suppliable in a targeted manner, in particular in a controlled and/or regulated manner, to the individual heat exchangers 179 in the circulating air devices 206.

The hot gas that is generated in the thermal exhaust gas cleaning device 181 is in particular exhaust gas from the thermal exhaust gas cleaning device 181. This exhaust gas is in particular a cleaned exhaust gas, so it is also designated a clean gas.

The hot gas line 183 is thus in particular also a clean gas line 185.

The gas to be supplied to the treatment chamber 110 is preferably indirectly heatable by means of the heat exchangers 179.

Figure 8:
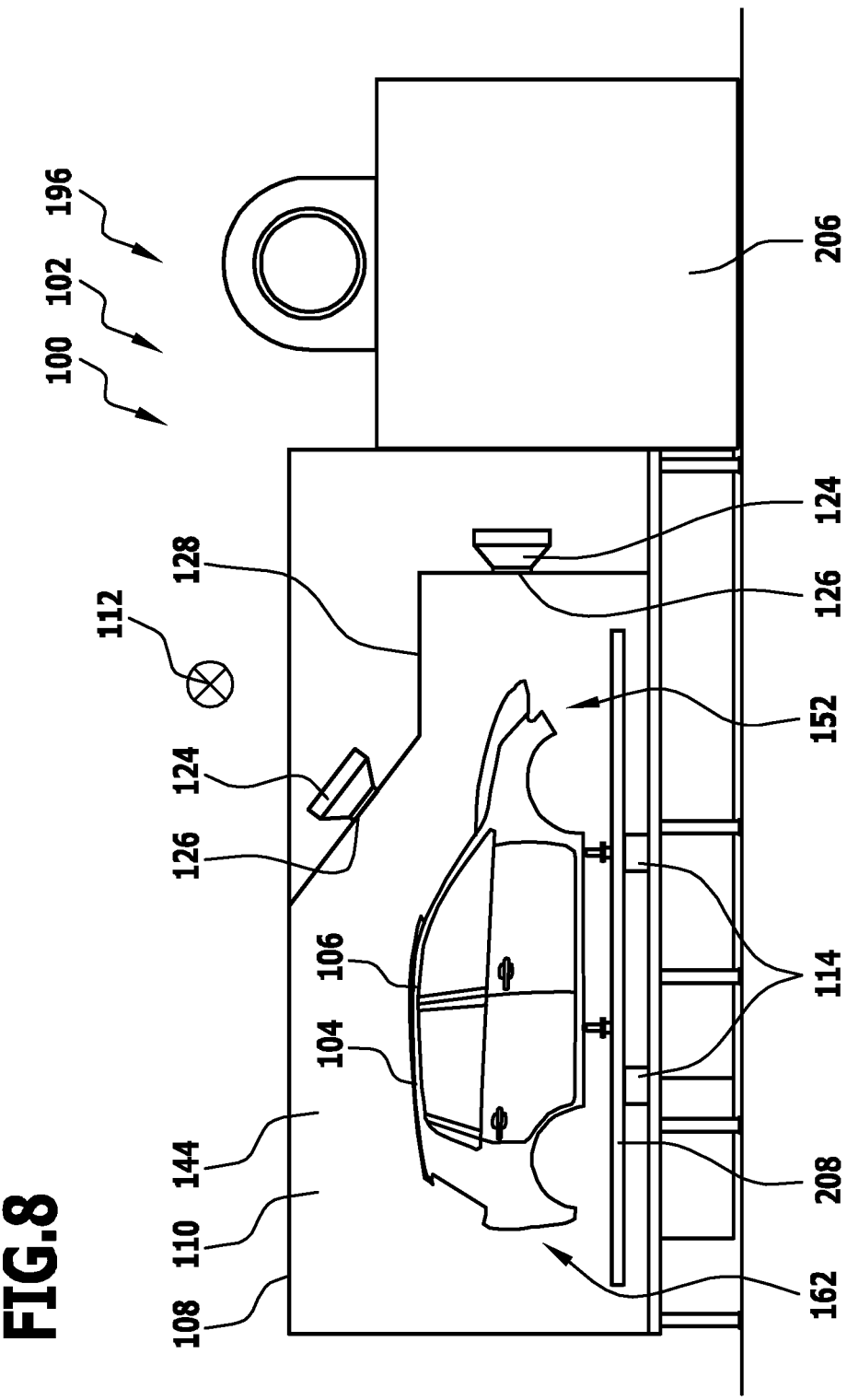
FIG. 8 shows a schematic vertical section through the treatment installation from FIG. 2, wherein a workpiece is arranged in a treatment chamber of the treatment installation.
Figure 9:
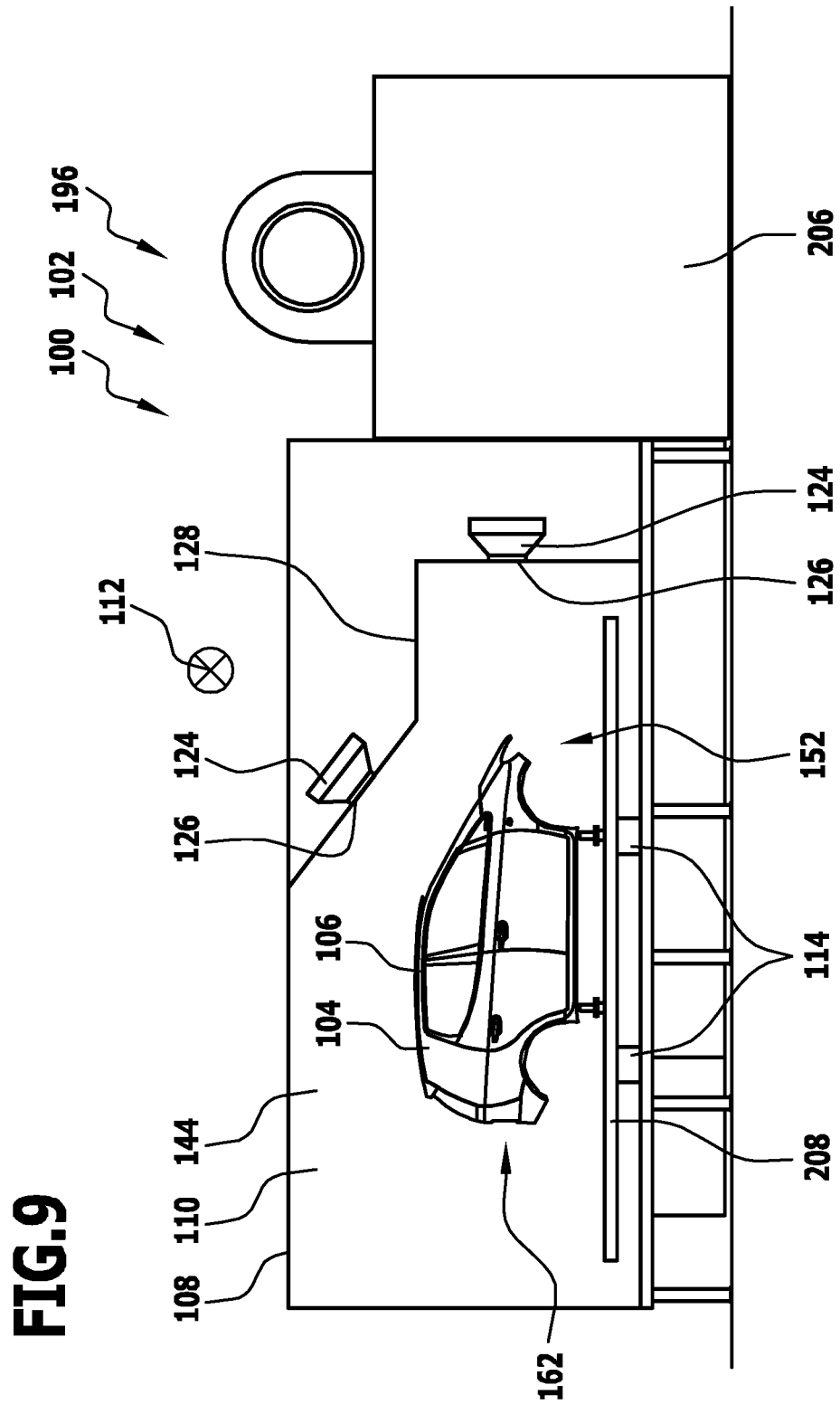
FIG. 9 shows a schematic illustration of the treatment installation from FIG. 2, corresponding to FIG. 8, wherein a workpiece of a different shape and/or size is arranged in the treatment chamber.
Figure 10:
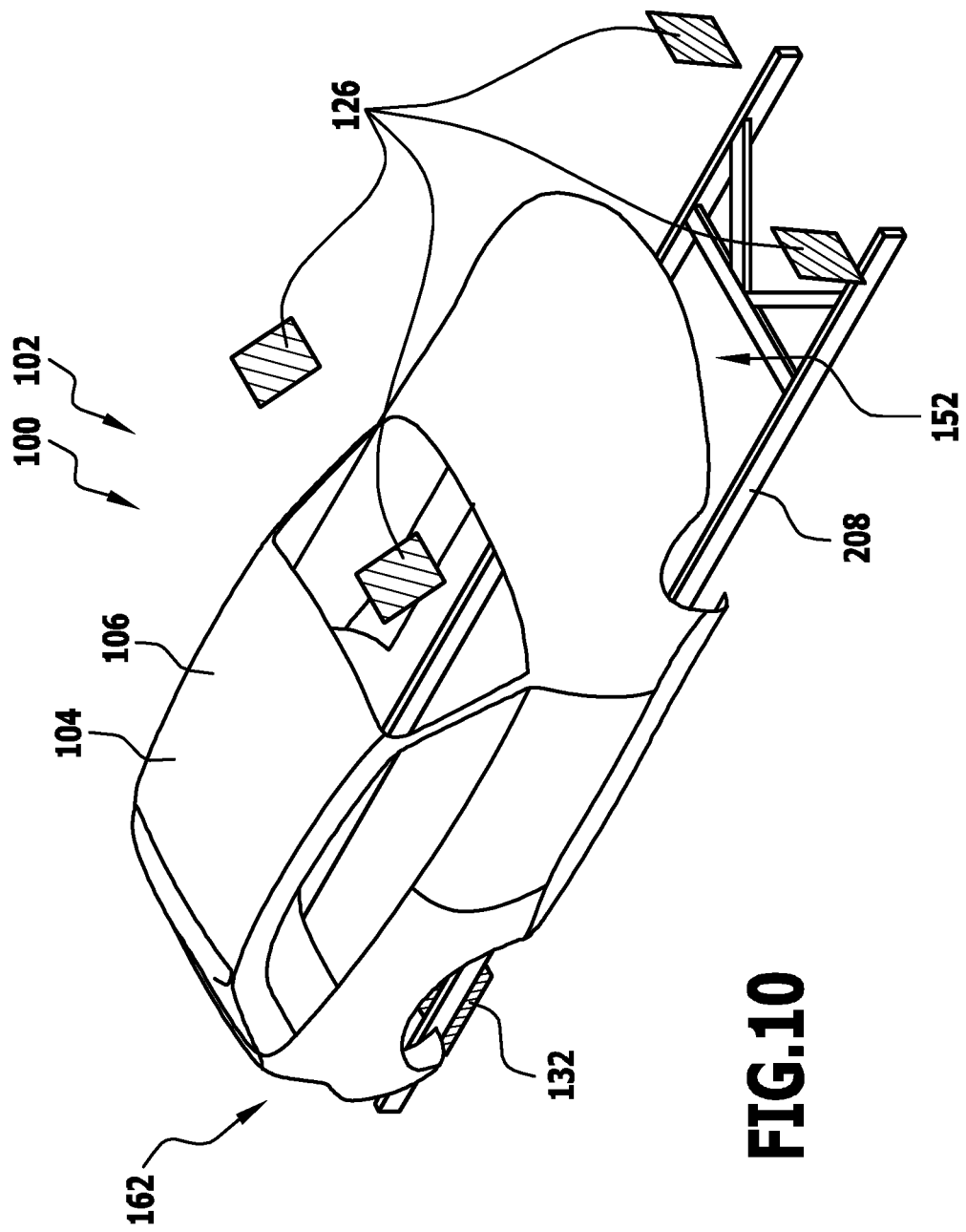
FIG. 10 shows a schematic perspective illustration of inlet openings and an outlet opening in the treatment installation and a workpiece to be treated.

As can be seen in particular from FIGS. 8 to 10, it may for example be provided for the workpieces 104 to be received by means of a respective skid 208.

The treatment installation 100 is in this case preferably suitable for selectively treating workpieces 104 of different types and/or sizes (see in particular FIGS. 8 and 9).

By suitable positioning and/or conveying of the workpieces 104, it is possible to ensure a uniform through flow of the gas stream, preferably even with different workpieces 104.

In particular, the workpieces 104 are preferably always positionable such that the inlet openings 126 arranged in the oblique section 158 of the dividing wall 128 are always directed though an entry opening 170 and into the workpiece interior 168.

Otherwise, the embodiment of a treatment installation 100 that is illustrated in FIGS. 2 to 10 corresponds, as regards its structure and functioning, to the embodiment illustrated in FIG. 1, so in this respect reference is made to the description thereof above.

FIGS. 11 to 24 illustrate different embodiments of treatment installations 100 that differ from one another and from the embodiments above substantially only as regards the arrangement of the inlet openings 126, the outlet openings 132, the dividing wall 128 and/or the conveying device 114.

For this reason, for the substantial structure of the embodiments of treatment installations 100 illustrated in FIGS. 11 to 24, the reader is referred to the statements above.

FIGS. 11 to 19 illustrate embodiments of treatment installations 100 in which transverse conveying is provided. With a transverse conveying of this kind, there is provided in particular conveying by means of the conveying device 114 such that the workpiece longitudinal direction 140 is oriented transversely, in particular perpendicular, to the conveying direction 112.

In the embodiments according to FIGS. 20 to 24, by contrast, longitudinal conveying is provided. With a longitudinal conveying of this kind, the workpiece longitudinal direction 140 is oriented parallel to the conveying direction 112.

FIGS. 11 to 15, 20 and 21 show different variants for supplying a gas stream to the treatment chamber 110.

FIGS. 16 to 18, 22 and 23 show different variants for removing the gas stream from the treatment chamber 110.

Figure 19:
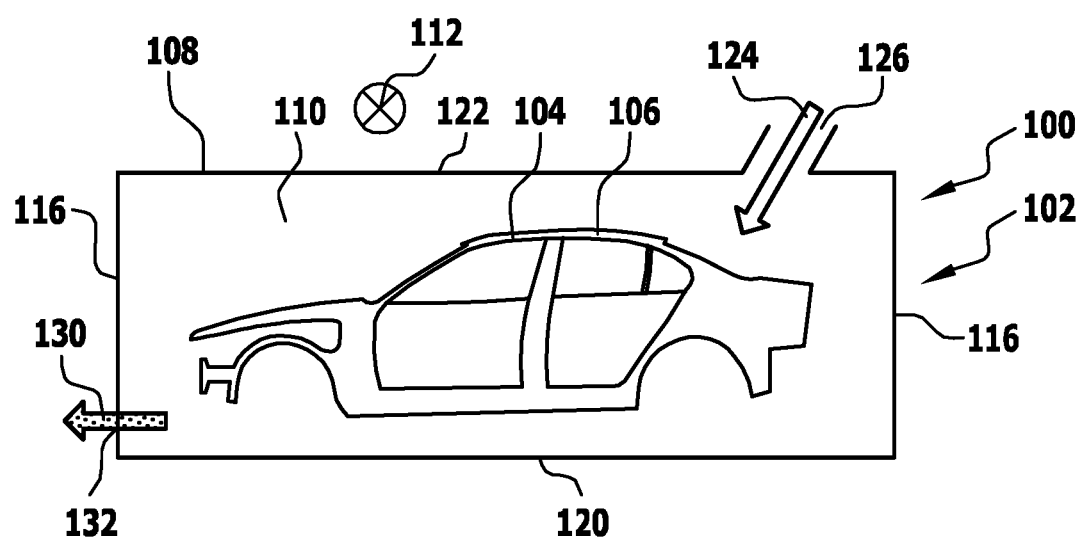
FIG. 19 shows a schematic vertical section through a treatment installation, wherein transverse conveying and a gas supply and a gas removal arrangement are provided such that there is a substantially diagonal flow through the treatment chamber.
Figure 24:
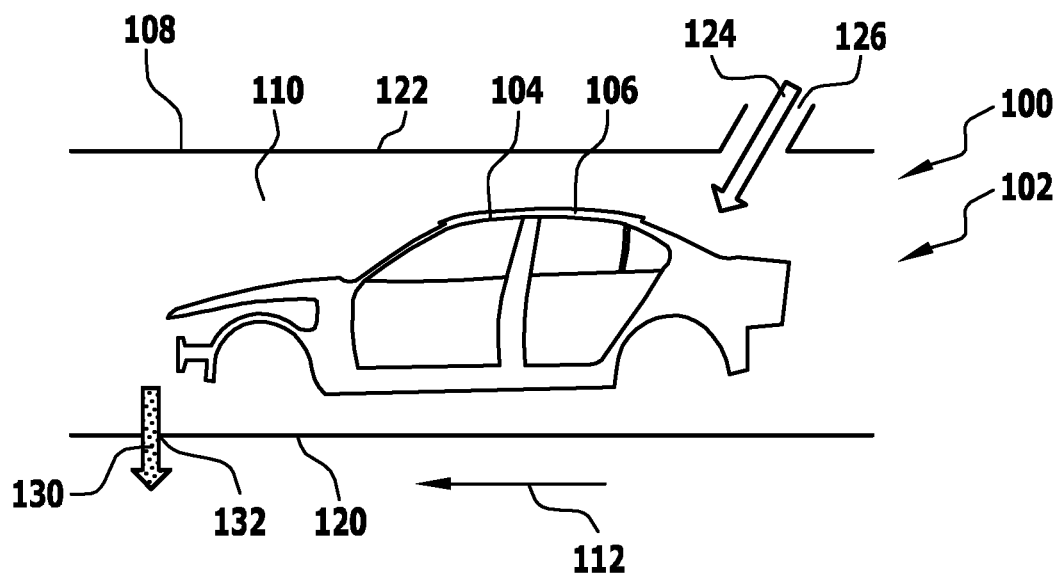
FIG. 24 shows a schematic vertical section through a treatment installation, wherein longitudinal conveying and a gas supply according to the embodiment illustrated in FIG. 19 are provided.

FIGS. 19 and 24 show examples of complete through flow, in particular together with a variant of gas supply and a variant of gas removal, wherein the gas stream flows through a workpiece 104 that takes the form for example of a vehicle body 106 in the workpiece longitudinal direction 140, from rear to front.

In principle, all the variants of gas supply are combinable with all the variants of gas removal.

Preferably, however, a supply of the gas stream on one side of the workpiece 104 and a removal of the gas stream on a further side of the workpiece 104, opposite to this side, is provided.

Figure 11:
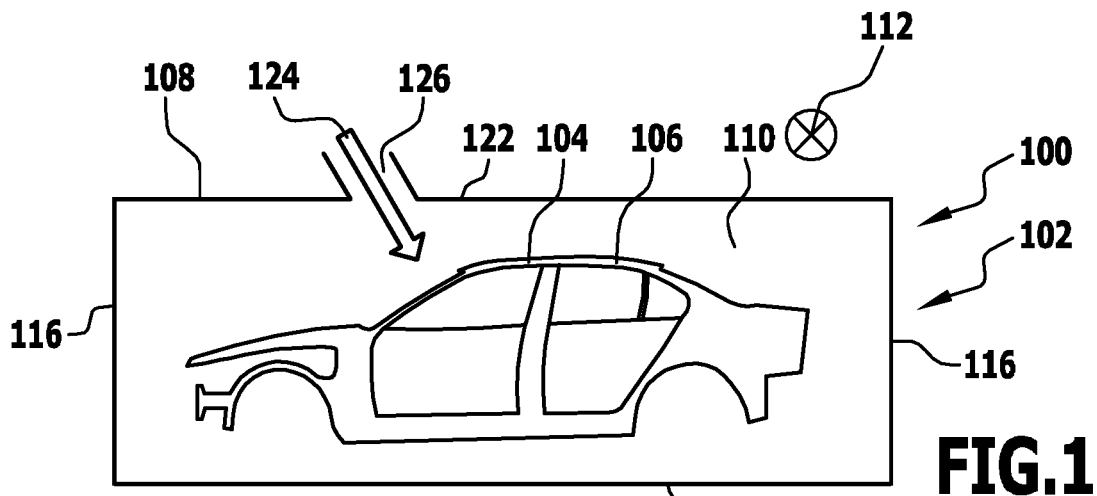
FIG. 11 shows a schematic vertical section through a treatment installation in which transverse conveying and a gas supply through a top wall are provided.

In FIG. 11, at least one inlet opening 126 is provided in a top wall 122 of the housing 108. Here, the inlet opening 126 takes a form such that a gas stream flowing therethrough can flow through the entry opening 170 and into the workpiece interior 168 of the workpiece 104.

Figure 12:
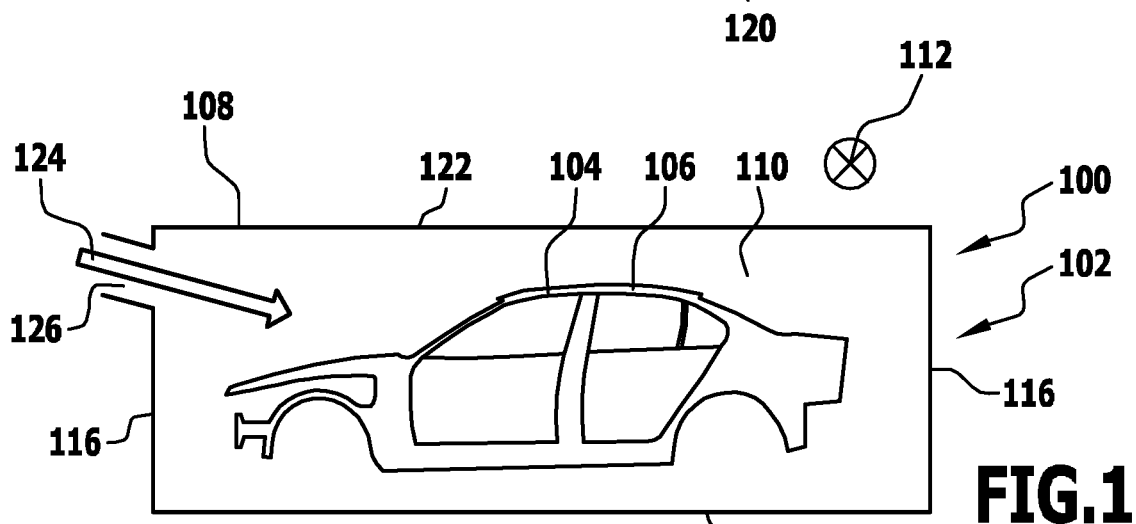
FIG. 12 shows a schematic vertical section through a treatment installation in which transverse conveying and a gas supply through a vertical side wall are provided.

According to FIG. 12, an oblique supply of the gas stream is provided in an upper region of a vertical side wall 116, in relation to the direction 118 of gravity. Here, the gas stream meets the front hood 156 of the workpiece 104 in particular obliquely from above and is then supplied to the entry opening 170 of the workpiece interior 168.

Figure 13:
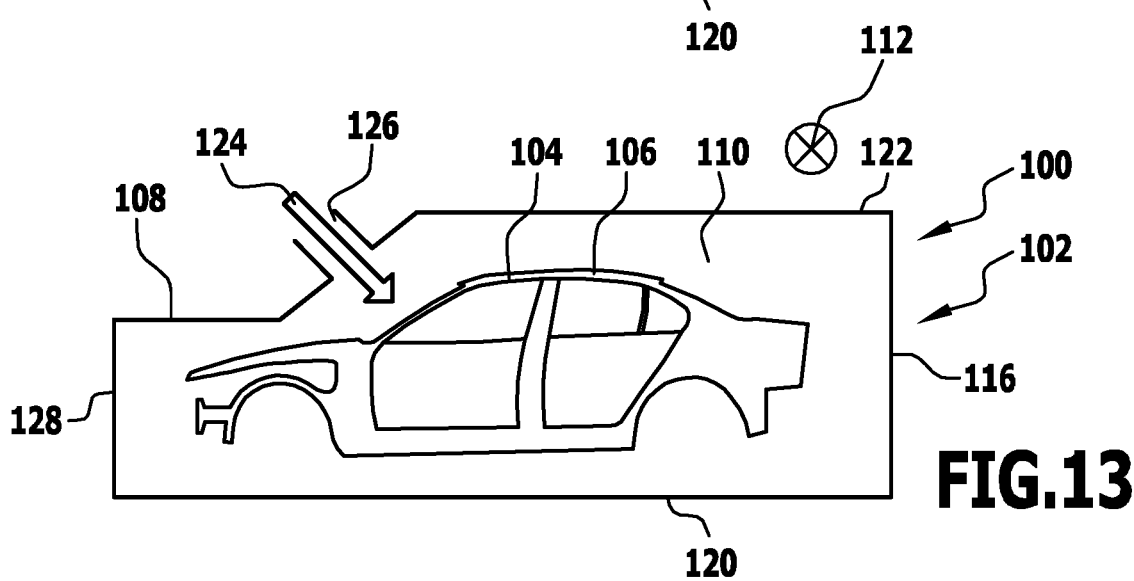
FIG. 13 shows a schematic vertical section through a treatment installation, wherein transverse conveying and a gas supply through a dividing wall that is adapted to the contour are provided.

According to FIG. 13, at least one inlet opening 126 that is arranged in the oblique section 158 of a dividing wall 128 is provided.

Figure 14:
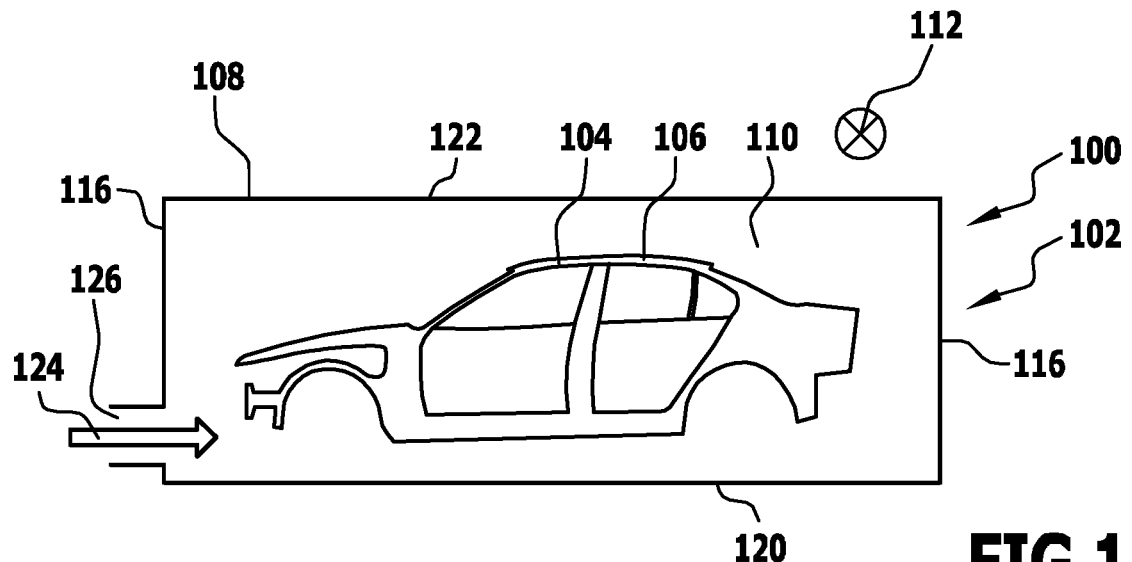
FIG. 14 shows a schematic vertical section through a treatment installation, wherein transverse conveying and a horizontal gas supply to a lower front region of the workpiece are provided.

According to FIG. 14, an inlet opening 126 that is arranged in a lower region of a vertical side wall 116, in relation to the direction 118 of gravity, is provided.

Figure 15:
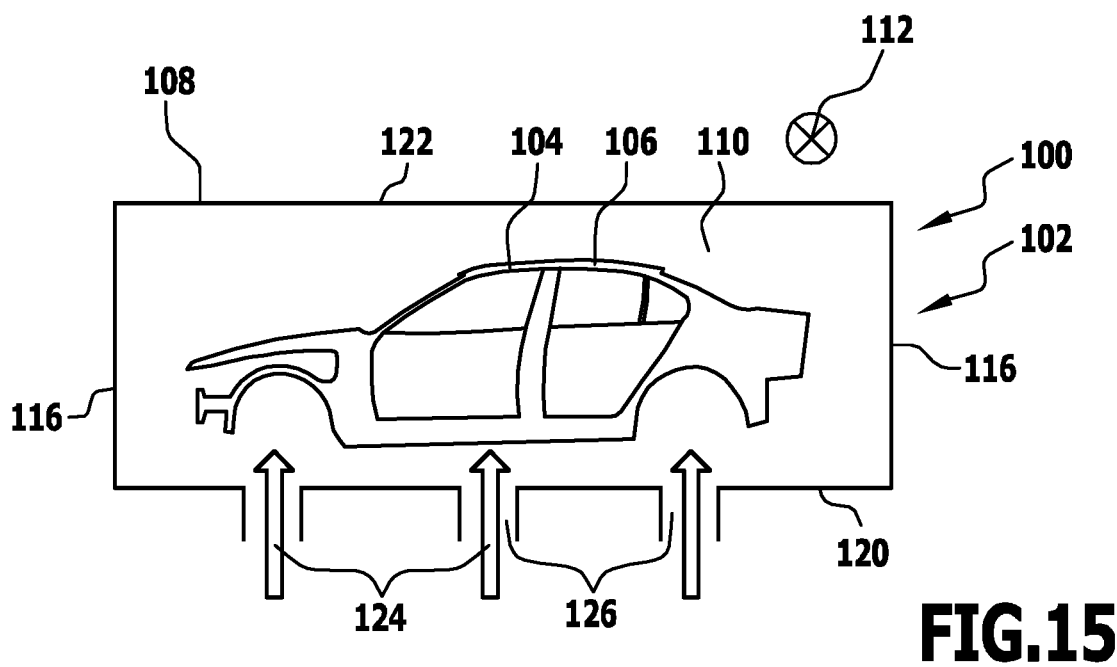
FIG. 15 shows a schematic vertical section through a treatment installation, wherein transverse conveying and three inlet openings for the gas supply through a base wall of the treatment installation are provided.

According to FIG. 15, three inlet openings 126 that are arranged distributed in the workpiece longitudinal direction 140 are provided in the base wall 120. Here, the gas stream is flowable through the workpiece 104 in particular in opposition to the direction 118 of gravity, from bottom to top.

Figure 16:
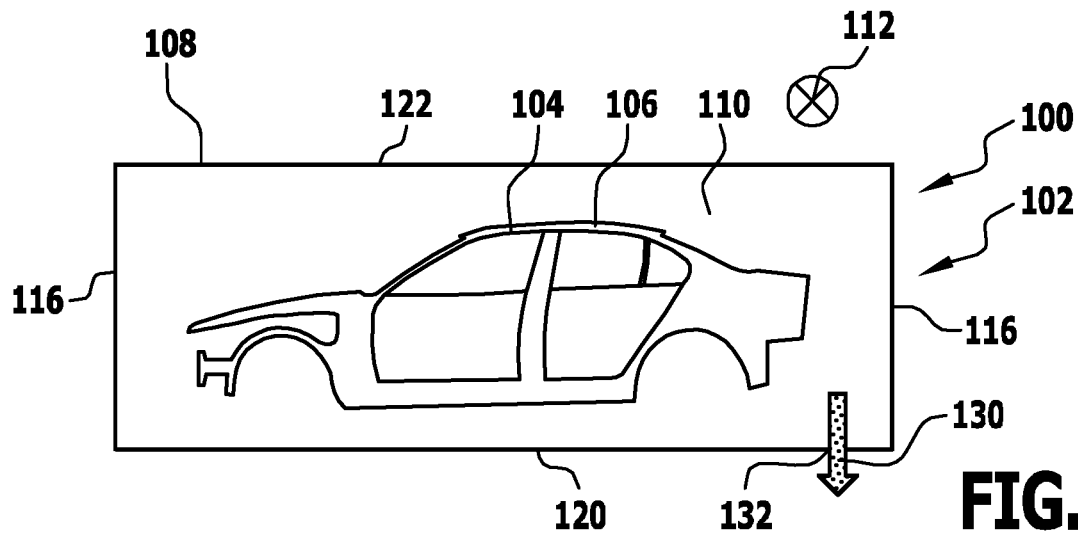
FIG. 16 shows a schematic vertical section through a treatment installation, wherein transverse conveying and a removal of gas through an outlet opening arranged in the base wall are provided.

According to FIG. 16, an outlet opening 132 is provided in the region of the vehicle rear 162, in the base wall 120 of the housing 108.

Figure 17:
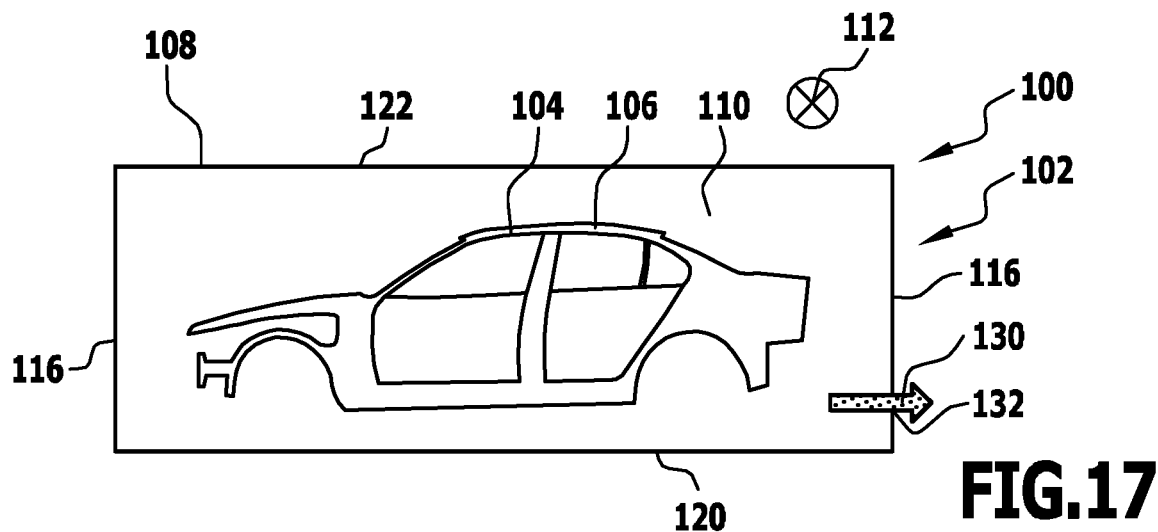
FIG. 17 shows a schematic vertical section through a treatment installation, wherein transverse conveying and a removal of gas through an outlet opening arranged in a side wall are provided.

According to FIG. 17, at least one outlet opening 132 is provided in the region of the vehicle rear 162, in the side wall 116.

Figure 18:
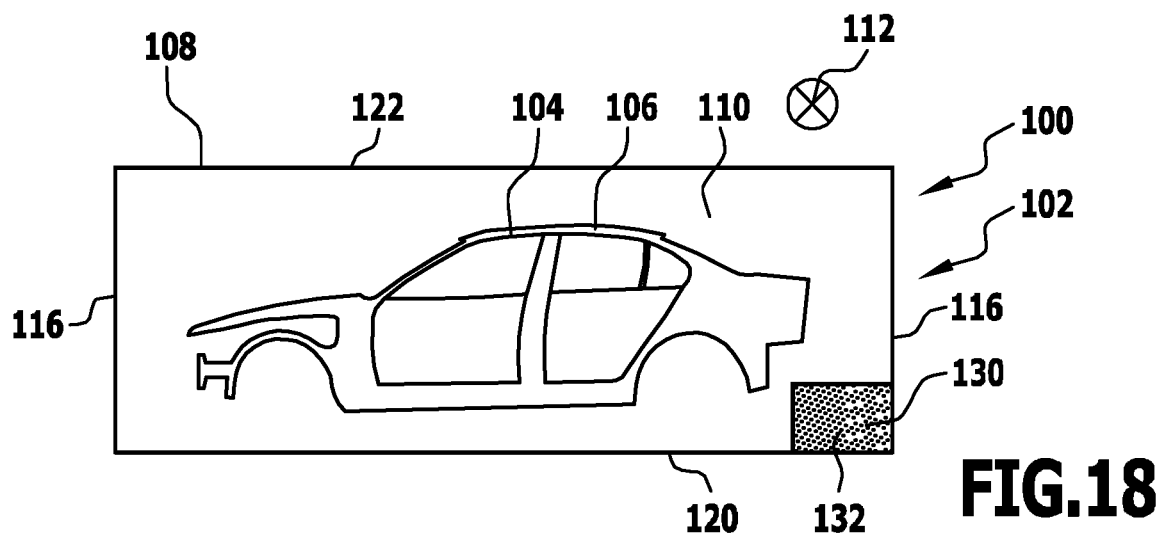
FIG. 18 shows a schematic vertical section through a treatment installation, wherein transverse conveying and a lateral removal of gas in the conveying direction are provided.

According to FIG. 18, gas removal is provided in a direction running parallel to the conveying direction 112, in particular to one or both sides of the workpiece 104 in relation to the workpiece longitudinal direction 140. In particular, outlet openings 132 are provided in the region of the vehicle rear 162.

According to FIG. 19, an inlet opening 126 is provided in the top wall 122 such that a gas stream is directed into an entry opening 170 between two C pillars 166 of the workpiece 104, which takes the form of a vehicle body 106.

Finally, the gas stream that is guided through the workpiece interior 168 is removable from the treatment chamber 110 in a lower region of a vertical side wall 116, in relation to the direction 118 of gravity, through an outlet opening 132 that is arranged there.

Figure 20:
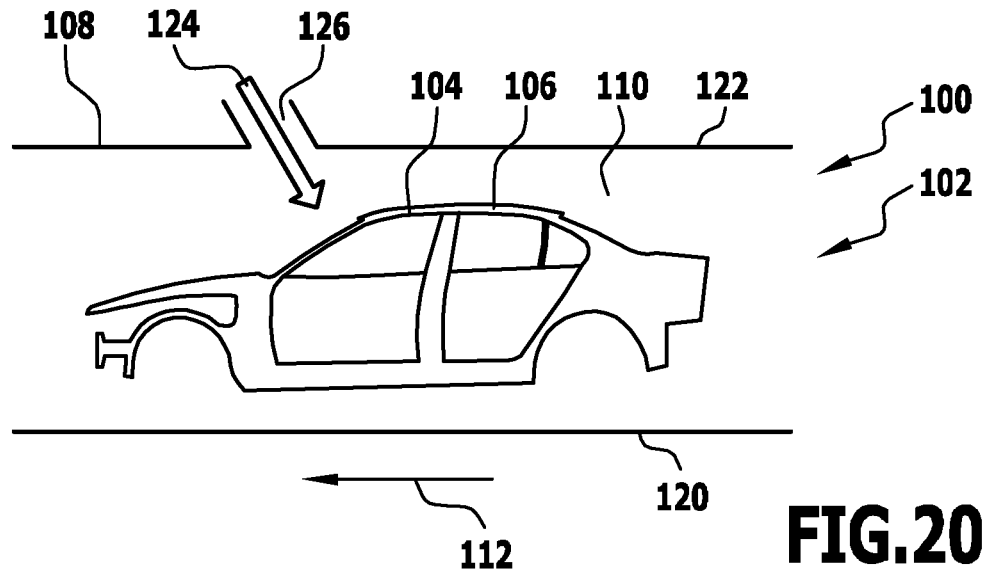
FIG. 20 shows a schematic vertical section through a treatment installation, wherein longitudinal conveying and a gas supply according to the embodiment in FIG. 11 are provided.

The gas supply according to FIG. 20 corresponds to that from FIG. 11.

Figure 21:
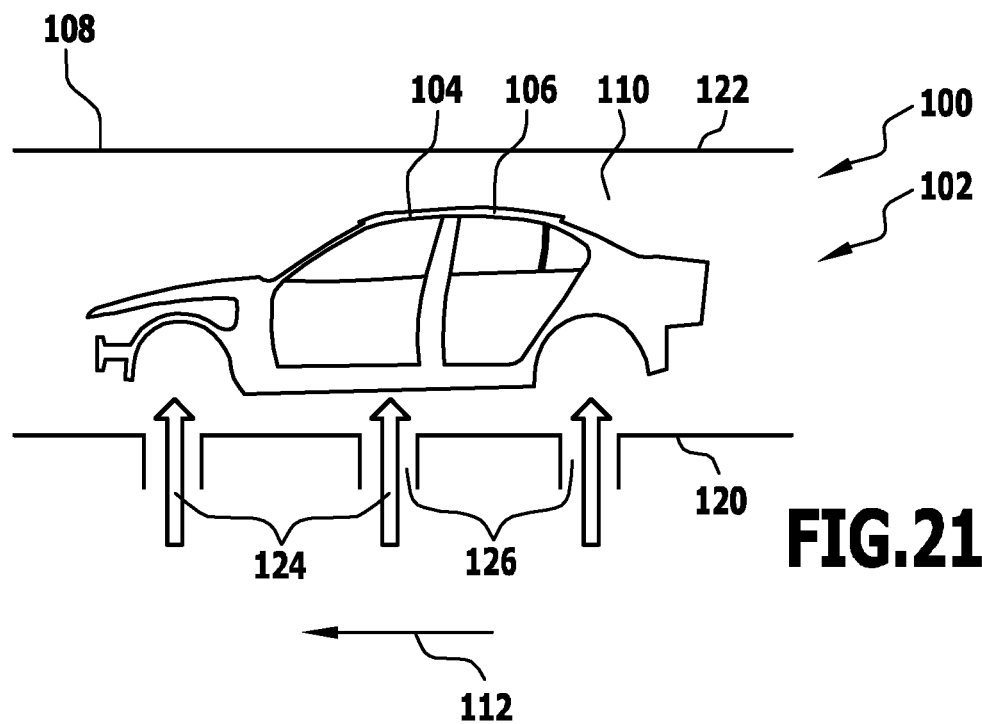
FIG. 21 shows a schematic vertical section through a treatment installation, wherein longitudinal conveying and a gas supply according to the embodiment illustrated in FIG. 15 are provided.

The gas supply according to FIG. 21 corresponds to that from FIG. 15.

Figure 22:
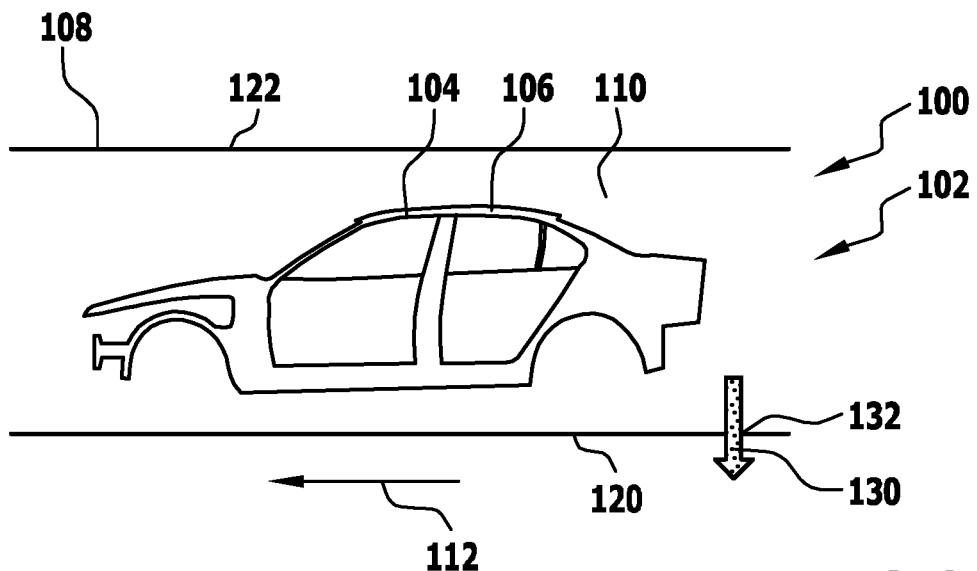
FIG. 22 shows a schematic vertical section through a treatment installation, wherein longitudinal conveying and a gas removal arrangement according to the embodiment illustrated in FIG. 16 are provided.

The gas removal according to FIG. 22 corresponds to that from FIG. 16.

Figure 23:
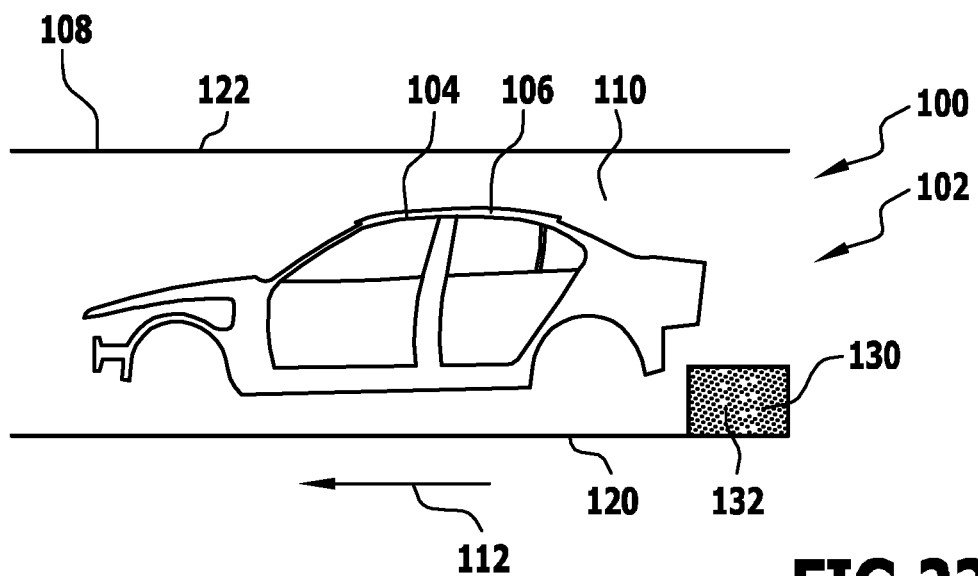
FIG. 23 shows a schematic vertical section through a treatment installation, wherein longitudinal conveying and a lateral removal of gas that is directed perpendicular to the conveying direction are provided.

The gas removal according to FIG. 23 corresponds to that from FIG. 18.

The flow through the workpiece 104 according to FIG. 19 is likewise provided in the variant according to FIG. 24.

As already mentioned, in the embodiments of the treatment installation 100 according to FIGS. 20 to 24 there is no transverse conveying, however, but a longitudinal conveying.

As can be seen in particular from FIG. 24, this means that the inlet openings 126 on the one hand and the outlet openings 132 on the other are arranged offset from one another in the conveying direction 112.

Because the direction in which the gas stream flows in is adapted to the one or more entry openings 170 in the workpieces 104, if there were continuous conveying of the workpieces 104 the result would be for example a greatly overheated roof region 174.

For this reason, the workpieces 104 are preferably conveyed in clocked manner by means of the conveying direction 114 and in particular are stopped in preferred holding positions, as illustrated for example in FIG. 24.

The desired flow through the workpiece interior 168 then takes place in these holding positions.

Figure 25:
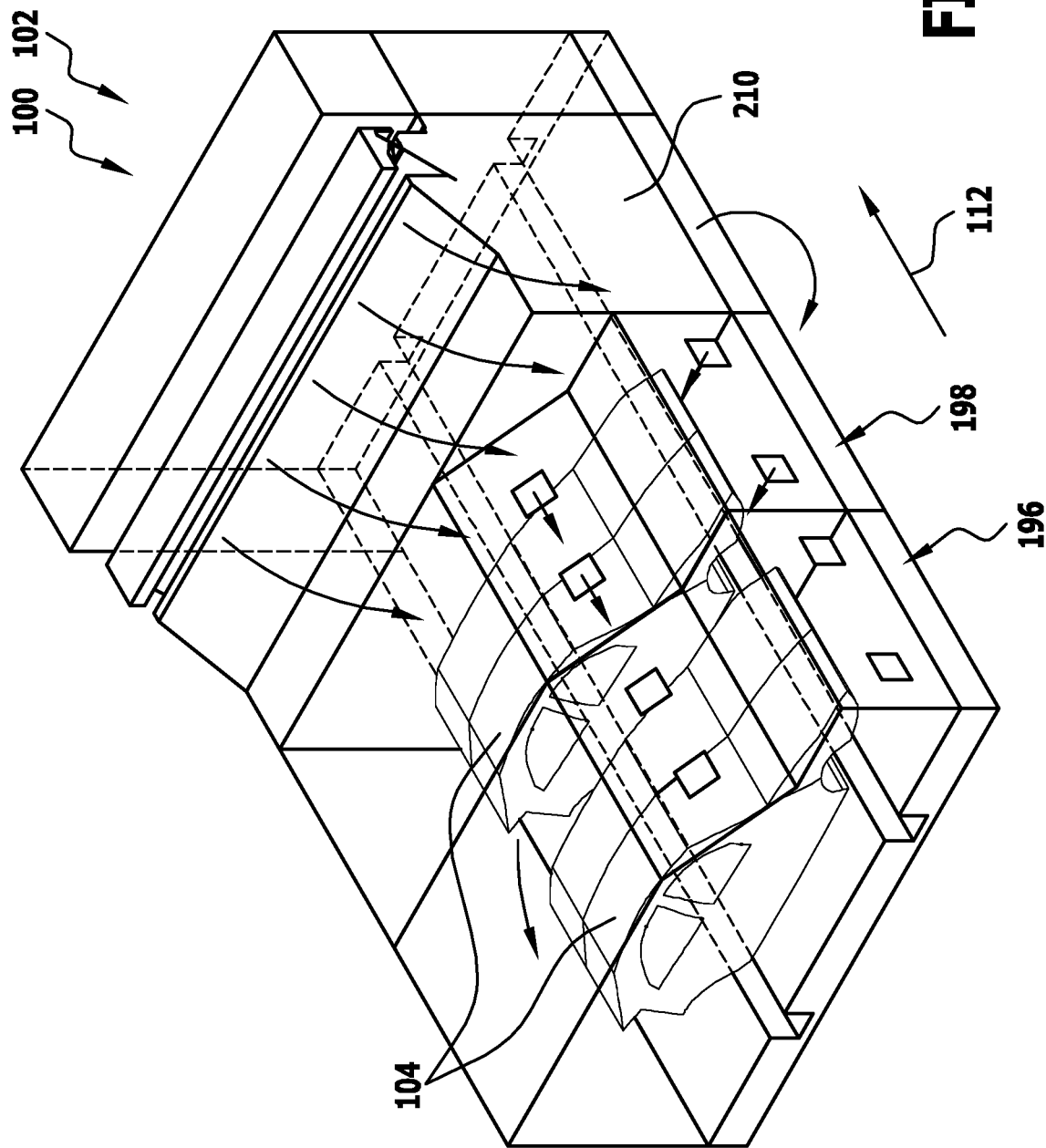
FIG. 25 shows a schematic perspective, partly transparent illustration of a cascaded gas guide arrangement.

A further embodiment of a treatment installation 100, illustrated in FIG. 25, differs from the first embodiment illustrated for example in FIG. 1 substantially in that the treatment installation 100 includes a lock 210.

Further, the treatment installation 100 includes a circulating air module 196 and a flushing module 198.

Here, it is in particular provided for the circulating air module 196, the flushing module 198 and the lock 210 to be arranged such that they succeed one another in this order in the conveying direction 112.

The treatment installation 100 preferably includes a gas guide arrangement such that unpolluted gas, for example a fresh air stream, is suppliable to the lock 210.

Thus, the lock 210 is in particular an airlock.

Gas that is guided through the lock 210, in particular an isolating gas stream, is preferably suppliable to the flushing module 198 by means of the gas guide arrangement of the treatment installation 100.

In particular, the gas stream in the flushing module 198 is guided through the treatment chamber 110, in particular the workpiece interior 168, as a flushing gas stream in order to remove contaminants that were previously therein as completely as possible and to take them out of the workpiece interior 168 and/or the treatment chamber 110. The contaminants are in particular solvent vapours.

The flushing gas stream that is removed from the flushing module 198 may preferably be re-used. For example, it may at least in part be added to a circulating air module 196 as incoming air. Further, supply to an exhaust gas cleaning device (not illustrated) may also be provided.

As a result of the described gas guidance arrangement of the treatment installation 100, it is possible in particular to enable energy-efficient operation of the treatment installation 100.

Otherwise, the embodiment of a treatment installation 100 that is illustrated in FIG. 25 preferably corresponds, as regards its structure and functioning, to the first embodiment illustrated in FIG. 1, so in this respect reference is made to the description thereof above.

Figure 26:
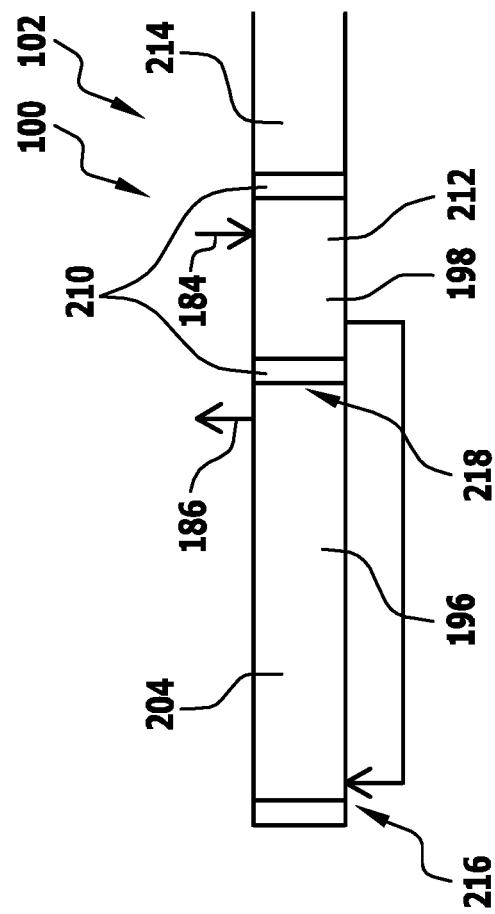
FIG. 26 shows a schematic illustration of an alternative embodiment of a gas guide arrangement of the treatment installation.

A further embodiment of a treatment installation 100, illustrated schematically in FIG. 26, differs from the embodiment illustrated in FIG. 25 substantially in that the treatment installation 100 includes, alongside a heating section 204 formed by one or more circulating air modules 196, a flushing section 212, formed for example by a flushing module 198, and a cooling section 214.

Further, preferably two locks 210 are provided, wherein one lock 210 separates the heating section 204 from the flushing section 212. The further lock 210 separates the flushing section 212 from the cooling section 214.

The heating section 204, one lock 210, the flushing section 212, the further lock 210 and the cooling section 214 are preferably arranged to succeed one another in this order in relation to the conveying direction 112.

The treatment installation 100 that is illustrated in FIG. 26 preferably includes a gas supply, in which a fresh air gas stream is suppliable to a lock 210 or to the flushing section 212.

A flushing gas stream that is guided through the flushing section 212 is preferably supplied to the heating section 204. In particular here, a supply is provided at an end 216 of the heating section 204 that is facing away from the flushing section 212.

Removal of the gas stream that is guided through the heating section 204 is preferably performed at an end 218 of the heating section 204 that faces the flushing section 212.

Otherwise, the embodiment of a treatment installation 100 that is illustrated in FIG. 26 corresponds, as regards its structure and functioning, to that illustrated in FIG. 25 and/or one of the embodiments illustrated in FIGS. 1 to 24, so in this respect reference is made to the description thereof above.

Figure 27:
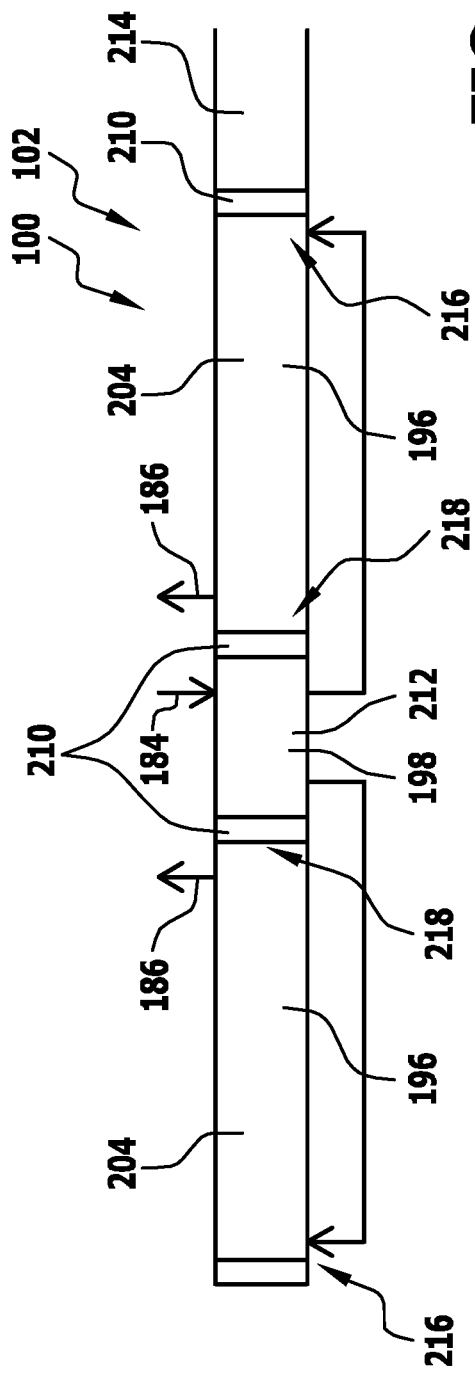
FIG. 27 shows a schematic illustration of a further alternative embodiment of a gas guide arrangement of the treatment installation.

An embodiment of a treatment installation 100 that is illustrated in FIG. 27 differs from the embodiment illustrated in FIG. 26 substantially in that the treatment installation 100 includes two heating sections 204 between which a flushing section 212 that is separated by means of two locks 210 is arranged.

A further lock 210 is preferably arranged between the heating section 204 that is at the rear, in relation to the conveying direction 112, and the cooling section 214.

In the embodiment of the treatment installation 100 that is illustrated in FIG. 27, it is preferably provided for the flushing gas stream that is guided through the flushing section 212 to be divided and for each partial gas stream to be supplied to an end 216 of a respective heating section 204 that is facing away from the flushing section 212.

Then, the gas stream that is guided through the respective heating section 204 is removed at the end 218 of each heating section 204 that is arranged to face the flushing section 212.

As a result of the selected gas guide arrangement, in the embodiment of the treatment installation 100 that is illustrated in FIG. 27 flow through the front heating section 204, as seen in the conveying direction 112, is preferably in the conveying direction 112, while flow through the rear heating section 204, as seen in the conveying direction 112, is preferably in opposition to the conveying direction 112. As a result, the part of the treatment installation 100 that is at the front as seen in the conveying direction 112 is enriched in particular with solvent, in particular upstream of the flushing section 212. As a result of guiding the gas stream in counter-current in the heating section 204 that is at the rear as seen in the conveying direction 112, there is preferably a particularly small discharge of solvent to the environment.

Otherwise, the embodiment of a treatment installation 100 that is illustrated in FIG. 27 corresponds, as regards its structure and functioning, to the embodiment illustrated in FIG. 26, so in this respect reference is made to the description thereof above.

Different variants of conveying devices 114 are illustrated in FIGS. 28 to 32.

These various variants of the conveying device 114 may preferably be used in all the variants of treatment installations 100 that are illustrated and described.

In particular, the conveying devices 114 are here provided for conveying the workpieces 104 along an overall conveying line 220.

This overall conveying line 220 preferably extends through all the sections of the treatment installation 100, in particular through the heating section 204, a flushing section 212 and/or a cooling section 214, or through a plurality of the said sections 204, 212, 214.

Moreover, by means of the respective conveying device 114 conveying through one or more locks 210 is also provided.

Figure 28:
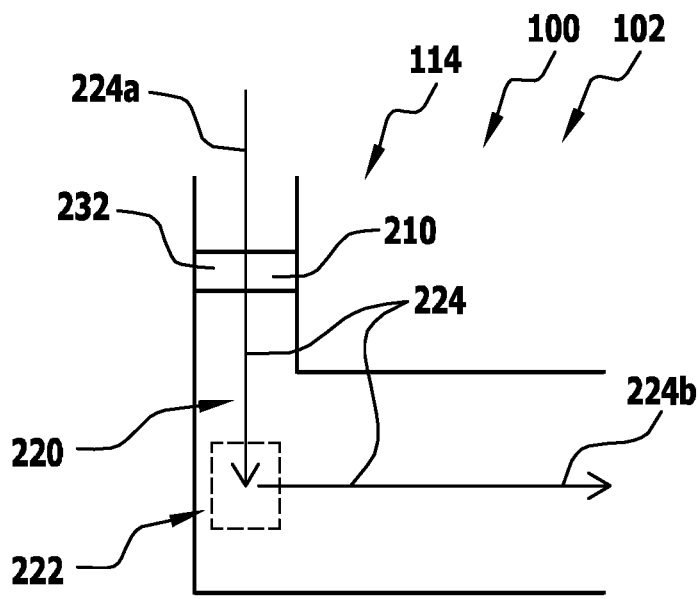
FIG. 28 shows a schematic plan view of a conveying device that includes a transfer device.

In the embodiment of a conveying device 114 that is illustrated in FIG. 28, it is provided for the conveying device 114 to include a transfer device 222.

By means of a transfer device 222 of this kind, a connection is in particular producible between two partial conveying lines 224 of the overall conveying line 220, which meet for example at an angle of 90°.

By means of the transfer device 222, it is in particular possible to pass on the workpieces 104 from one partial conveying line 224 to the further partial conveying line 224 such that the workpieces 104 maintain their global rotational orientation unchanged in relation to the treatment installation 100.

If for example in a first partial conveying line 224a longitudinal conveying of the workpieces 104 is provided, and this partial conveying line 224a meets a second partial conveying line 224b that runs perpendicular thereto, a transverse conveying is produced in the region of the second partial conveying line 224b with an unchanged rotational orientation of the workpieces 104.

A conveying device 114 according to the embodiment illustrated in FIG. 28 is particularly suitable if there is a need to pass through a lock 210 having the smallest possible cross section but thereafter a transverse conveying is preferred.

Figure 29:
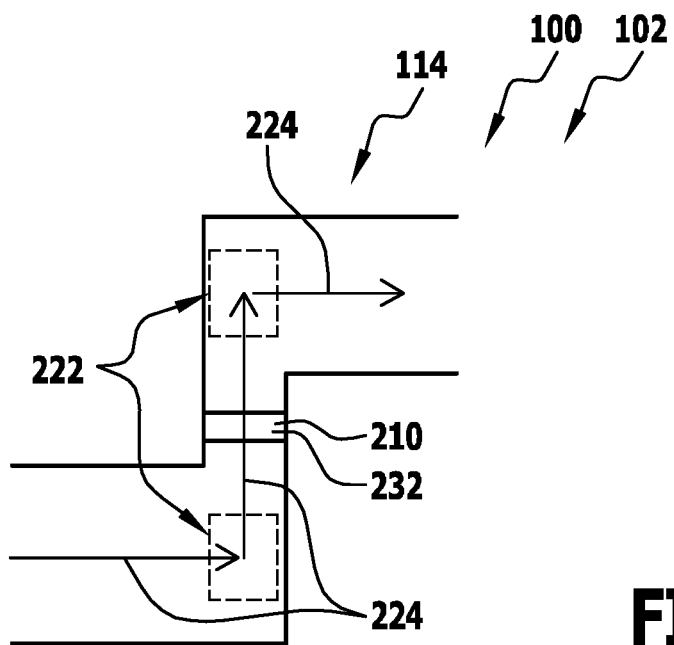
FIG. 29 shows a schematic plan view of a conveying device in which two transfer devices are provided.

An embodiment of a conveying device 114 that is illustrated in FIG. 29 differs from the embodiment illustrated in FIG. 28 substantially in that three partial conveying lines 224 and two transfer devices 222 are provided. By means of the conveying device 114, in this case in particular initially transverse conveying of the workpieces 104 is transferable to a longitudinal conveying thereof, for example in order to guide them through a lock 210. Thereafter, the workpieces 104 are in particular transferable once again in order to enable a further transverse conveying.

Otherwise, the embodiment in FIG. 29 corresponds, as regards its structure and functioning, to the embodiment illustrated in FIG. 28, so in this respect reference is made to the description thereof above.

By means of a conveying device 114 according to the embodiment illustrated in FIG. 29, it is possible in particular to perform a lateral displacement of the workpieces 104 (in a direction running perpendicular to the conveying direction).

It may further be provided for a conveying device 114 to include substantially two conveying devices 114 according to the embodiment illustrated in FIG. 29, which are arranged and take a form such that the workpieces 104 are initially laterally displaceable and thereafter are movable back to an original straight line in which they are conveyed.

Figure 30:
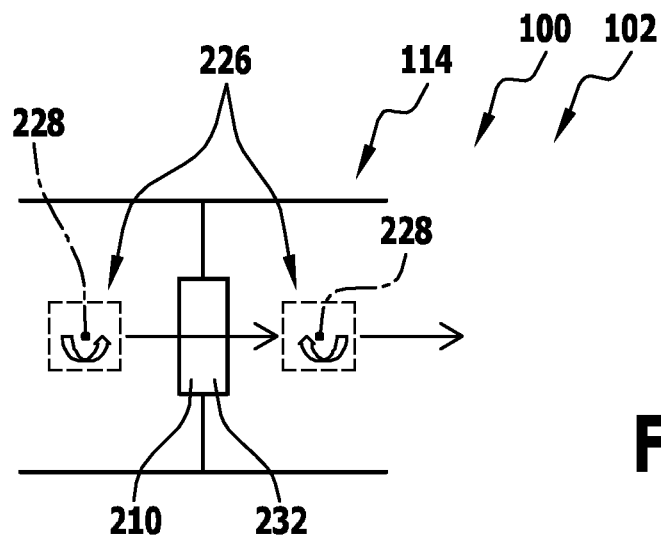
FIG. 30 shows a schematic plan view of a further embodiment of a conveying device, in which two rotation devices are provided.

A further embodiment of a conveying device 114 that is illustrated in FIG. 30 differs from the embodiment illustrated in FIG. 28 substantially in that the conveying device 114 includes two rotation devices 226.

By means of each rotation device 226, the workpieces 104 are preferably rotatable about a vertical axis of rotation 228.

By means of the rotation device 226, a global rotational orientation of the workpieces 104 in relation to the treatment installation 100 is thus variable, in particular without varying a general conveying direction 112 in two partial conveying lines 224 that are connected to one another by means of the respective rotation device 226.

In the embodiment of the treatment installation 100 that is illustrated in FIG. 30, it is in particular provided for the workpieces 104 first of all to be conveyed in an orientation that is perpendicular to the conveying direction 112, that is to say transverse conveying is provided. By means of a rotation device 226, a rotation of the workpieces 104 is then performed, preferably upstream of a lock 210, in order to convert the transverse conveying to a longitudinal conveying. The workpieces 104 are then guided through the lock 210 in this longitudinal orientation and thereafter are rotated once again by means of a further rotation device 226 in order ultimately to continue transverse conveying.

During this, preferably the conveying direction 112 does not change.

Otherwise, the embodiment of a conveying device 114 that is illustrated in FIG. 30 preferably corresponds, as regards its structure and functioning, to the embodiment illustrated in FIG. 28, so in this respect reference is made to the description thereof above.

Figure 31:
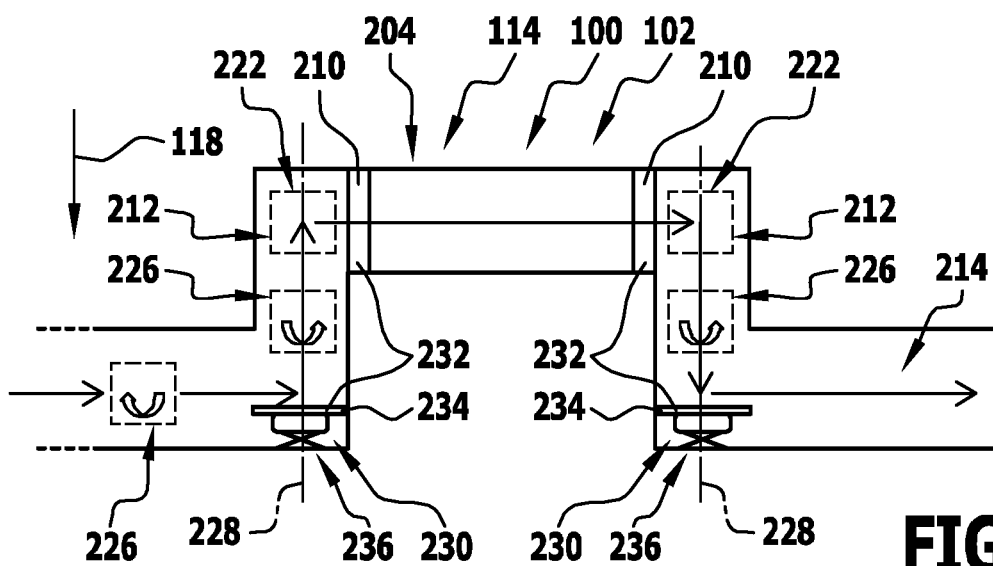
FIG. 31 shows a schematic side view of a further embodiment of a conveying device, in which a rotation device, a lifting device and a transfer device are provided.

An embodiment of a conveying device 114 that is illustrated in FIG. 31 differs from the embodiment illustrated in FIG. 28 substantially in that the conveying device 114 includes not only a rotation device 226 but also a transfer device 222 and a lifting device 230.

This conveying device 114 is in particular usable in a treatment installation 100 that takes the form of a so-called A-type oven.

It may be favourable if the treatment installation 100 includes a heating section 204 and/or a flushing section 212 that is arranged above, in particular entirely above, a cooling section 214 in relation to the direction 118 of gravity. As a result of this an undesired heat discharge from the heating section 204 can be avoided or at least reduced.

The workpieces 104 are conveyable through the heating section 204, preferably along a first partial conveying line 224, and suppliable to the flushing section 212.

The flushing section 212 is separable from the heating section 204 and/or the cooling section 214 preferably by means of two mechanical separating elements 232.

A separating element 232 may for example take the form of a roll-up gate or lifting gate that is introducible between the heating section 204 and the flushing section 212.

A further separating element 232 is for example a base plate 234 of the lifting device 230.

In this case, the base plate 234 closes off, downwards in relation to the direction 118 of gravity, in particular an interior of the flushing section 212 when the lifting device 230 is in a lifted position, for example in order to be able to receive workpieces 104 at the level of the heating section 204.

In order to transfer workpieces 104 in the region of the flushing section 212, a transfer device 222 may optionally be provided.

The workpieces 104 are lowerable by means of the lifting device 230 from the level of the heating section 204 to the level of the cooling section 214 and then, in particular by means of an optional transfer device 222, are transferable to a further partial conveying line 224.

It may be provided for a global rotational orientation of the workpieces 104 in relation to the treatment installation 100 to be varied by means of one or more rotation devices 226.

For example, together with the lifting device 230, a rotation device 226 may form an integrated handling device 236.

Here, it may be provided in particular for the workpieces 104, as they are lifted or lowered by means of the lifting device 230, at the same time to be rotated about a vertical axis of rotation 228.

A further rotation device 226 that is arranged for example in the cooling section 214 may further serve for optimised conveying of the workpieces 104 in this cooling section 214.

Otherwise, the embodiment of a conveying device 114 and/or of the overall treatment installation 100 that is illustrated in FIG. 31 corresponds, as regards its structure and functioning, selectively to one or more of the embodiments described above, so in this respect reference is made to the description thereof above.

Figure 32:
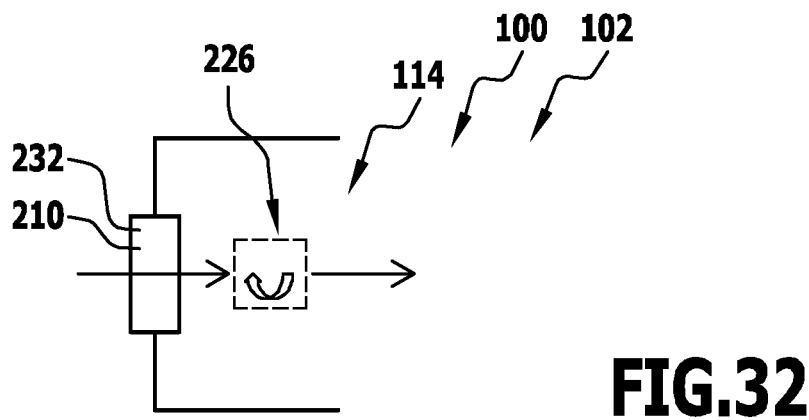
FIG. 32 shows a schematic plan view of a further alternative embodiment of a conveying device, in which a rotation device that is arranged in a treatment chamber is provided.

An embodiment of a conveying device 114 that is illustrated in FIG. 32 differs from the embodiment illustrated in FIG. 30 substantially in that only one rotation device 226 is provided.

Thus, as regards the conveying direction 112 upstream of the lock 210, preferably a longitudinal conveying of the workpieces 104 is provided in order to enable the workpieces 104 to be guided through the lock 210 with the smallest possible cross section. Downstream of the lock 210, the longitudinal conveying is preferably transferable to a transverse conveying by means of the rotation device 226.

Otherwise, the embodiment of a conveying device 114 that is illustrated in FIG. 32 corresponds, as regards its structure and functioning, to the embodiment illustrated in FIG. 30, so in this respect reference is made to the description thereof above.

The invention claimed is:

1. A treatment installation for treating workpieces, in a form of coated vehicle bodies, wherein the treatment installation includes a treatment chamber and a conveying device arranged to supply the workpieces to the treatment chamber, remove the workpieces from the treatment chamber, and/or convey the workpieces through the treatment chamber in a conveying direction,
wherein the treatment installation includes a plurality of inlet openings for supplying gas to the treatment chamber and a plurality of outlet openings for removing gas from the treatment chamber which are arranged on mutually opposing sides of the workpiece, wherein flow through the treatment chamber is provided such that at least 70% of the gas flowing in through the plurality of inlet openings is removable from the treatment chamber through the plurality of outlet openings, wherein
the workpieces are receivable by the conveying device and are conveyable through the treatment chamber, at least in certain regions, such that a longitudinal direction of the workpieces is oriented transversely to the conveying direction,
wherein the inlet openings and the outlet openings are arranged such that the gas is flowable through the treatment chamber transversely to the conveying direction.

2. A treatment installation according to claim 1, wherein inlet openings for supplying gas to the treatment chamber and the outlet openings for removing gas from the treatment chamber are arranged on mutually different sides of a vertical workpiece transverse center plane.

3. The treatment installation according to claim 1, wherein at least one inlet opening and at least one outlet opening are arranged at a distance from one another that is at least approximately 60%, in particular at least approximately 80%, of a total length of the workpiece, as seen in a workpiece longitudinal direction.

4. The treatment installation according to claim 1, wherein the inlet openings and the outlet openings are arranged on different sides of the treatment chamber in relation to a vertical longitudinal center plane of the treatment chamber.

5. The treatment installation according to claim 1, wherein the plurality, in particular all, of the inlet openings are arranged in one of two semi-chambers of the treatment chamber that are divided by a longitudinal center plane that runs vertically, horizontally or obliquely thereto, and/or wherein the plurality, in particular all, of the outlet openings are arranged in one, in particular a further one, of the two semi-chambers of the treatment chamber that are divided by the longitudinal center plane that runs vertically, horizontally or obliquely thereto.

6. The treatment installation according to claim 1, wherein the inlet openings and the outlet openings are arranged at least approximately opposite one another in relation to a diagonal plane, wherein the diagonal plane extends parallel to the conveying direction and substantially diagonally through the treatment chamber.

7. The treatment installation according to claim 1, wherein the inlet openings and the outlet openings are arranged such that gas is flowable through the treatment chamber substantially perpendicular; to the conveying direction and/or at least approximately diagonally.

8. The treatment installation according to claim 1, wherein the treatment installation includes at least one circulating air module, wherein each circulating air module preferably includes the following:
- a gas supply for supplying gas to the treatment chamber; and/or
- a gas removal arrangement for removing gas from the treatment chamber; and/or
- a fan device for driving a circulating air gas stream; and/or
- a separation device for separating contaminants out of the circulating air gas stream; and/or
- a distributor device for distributing the circulating air gas stream that is to be supplied to the treatment chamber over a plurality of inlet openings of the gas supply; and/or
- a collecting device to enable merging of the circulating air gas stream that is removed from the treatment chamber through a plurality of outlet openings of the gas removal arrangement.

9. The treatment installation according to claim 1, wherein the treatment installation, in particular one or more circulating air modules of the treatment installation, includes one or more return ducts that each connect one or more outlet openings, through which a gas stream, in particular a circulating air gas stream and/or a flushing gas stream, is removable from the treatment chamber, to a respective one or more inlet openings for supplying the circulating air gas stream and/or a flushing gas stream to the treatment chamber, wherein the one or more return ducts run at least approximately along planes that are oriented perpendicular to the conveying direction or extend at least approximately along planes that are oriented perpendicular to the conveying direction.

10. The treatment installation according to claim 9, wherein one or more, in particular all, of the return ducts and the one or more outlet openings and one or more inlet openings are connected to one another by the respective return duct such that an annular gas flow is producible within a circulating air module, and this annular gas flow extends at least approximately along a plane that is oriented perpendicular to the conveying direction.

11. The treatment installation according to claim 1, wherein the treatment installation includes a heating installation that includes a self-contained heating gas guide arrangement, wherein a plurality of circulating air modules are coupled to the heating gas guide arrangement, in particular for the purpose of heating the gas stream guided through the treatment chamber.

12. The treatment installation according to claim 1, wherein the treatment installation includes at least one flushing module, wherein each flushing module preferably includes the following:
- a gas supply for supplying gas to the treatment chamber; and/or
- a gas removal arrangement for removing gas from the treatment chamber; and/or
- a fan device for driving a flushing gas stream; and/or
- a separation device for separating contaminants out of the flushing gas stream; and/or
- a distributor device for distributing the flushing gas stream that is to be supplied to the treatment chamber over a plurality of inlet openings of the gas supply; and/or
- a collecting device to enable merging the flushing gas stream that is removed from the treatment chamber through a plurality of outlet openings of the gas removal arrangement.

13. The treatment installation according to claim 8, wherein the distributor device is separated from the treatment chamber by a dividing wall, wherein at least one inlet opening, in particular all the inlet openings, are preferably made in the dividing wall.

14. The treatment installation according to claim 13, wherein the dividing wall is formed to follow a workpiece longitudinal contour, at least in certain regions.

15. The treatment installation according to claim 13, wherein the dividing wall-includes a substantially vertical section that runs at least approximately parallel to a vehicle front or a vehicle rear of a vehicle body, a substantially horizontal section that runs at least approximately parallel to a front hood or rear hood of the vehicle body, and/or an oblique section that runs at least approximately parallel to A pillars or C pillars of the vehicle body.

16. The treatment installation according to claim 15, wherein the dividing wall includes a plurality of inlet openings in the substantially vertical section that runs at least approximately parallel to a vehicle front or a vehicle rear of a vehicle body and/or a plurality of inlet openings in the oblique section that runs at least approximately parallel to A pillars or C pillars of the vehicle body.

17. The treatment installation according to claim 8, wherein
a) the treatment installation includes a plurality of flushing modules and/or a plurality of circulating air modules, wherein each circulating air module forms a heating zone or a holding zone of the treatment chamber; and/or
b) the treatment installation includes one or more flushing modules and/or one or more circulating air modules that are formed by a respective transport unit, wherein a transport unit is a transportable unit that is transportable from one location to another location as a whole and/or without further subdivision or further dismantling into constituent parts of the transport unit; and/or
c) the treatment installation includes a plurality of transport units that each form a transportable unit that is transportable from one location to another location as a whole and/or without further subdivision or further dismantling into constituent parts of the transport unit, wherein there is associated with the transport units in each case precisely one processing cycle and/or in each case precisely one processing position or holding position for processing a workpiece.

18. The treatment installation according to claim 8, wherein
the collecting device includes a collecting duct that is preferably arranged outside the treatment chamber and into which a plurality of outlet openings open, and/or
the collecting device includes a return duct to enable guiding of the circulating air gas stream or flushing gas stream removed from the treatment chamber through a plurality of outlet openings to the fan device, the separation device and/or the distributor device.

19. The treatment installation according to claim 1, wherein at least one of the outlet openings for removing gas from the treatment chamber is arranged in a base wall or side wall that delimits the treatment chamber.

20. The treatment installation according to claim 1, wherein the conveying device includes at least one of
a) a rotation device for varying a rotational orientation of the workpieces about a vertical axis of rotation
b) a lifting device for lifting the workpieces from a first level to a second level and/or for lowering the workpieces from the second level to the first level;
c) a transfer device for transferring the workpieces from one partial conveying line to a further partial conveying line, wherein the conveying directions in the two partial conveying lines are different from one another, and wherein a global rotational orientation of the workpieces in relation to the treatment installation is identical in both partial conveying lines;
d) a rotation device for varying a rotational orientation of the workpieces about a vertical axis of rotation and a lifting device for lifting the workpieces from a first level to a second level and/or for lowering the workpieces from the second level to the first level, wherein the rotation device and the lifting device take the form of an integrated handling device for handling the workpieces between two partial conveying lines.

21. A method for treating workpieces in a form of coated vehicle bodies, wherein the method includes the following:
supplying workpieces to a treatment chamber of a treatment installation; and/or
guiding workpieces through the treatment chamber; and/or
removing workpieces from the treatment chamber
wherein gas is supplied to the treatment chamber through a plurality of inlet openings and
wherein the gas is removed from the treatment chamber through a plurality of outlet openings,
wherein the plurality of inlet openings and the plurality of outlet openings are arranged on mutually opposing sides of the workpiece,
wherein flow through the treatment chamber is provided such that at least 70% of the gas flowing in through the plurality of inlet openings is removed from the treatment chamber through the plurality of outlet openings,
wherein the workpieces are received by a conveying device and are conveyed through the treatment chamber, at least in certain regions, such that a longitudinal direction of the workpieces is oriented transversely to a conveying direction,
wherein the inlet openings and the outlet openings are arranged such that the gas flows through the treatment chamber transversely to the conveying direction.

22. The method according to claim 21, wherein the workpieces are conveyed through the treatment chamber, at least in certain regions, by a conveying device such that a longitudinal direction of the workpieces is oriented at least approximately horizontally and/or substantially perpendicular to the conveying direction.

23. The method according to claim 21, wherein the supply and the removal of the gas are performed on mutually different sides of a vertical workpiece transverse center plane.

24. The method according to claim 21, wherein the workpieces are conveyed through the treatment chamber discontinuously and/or in clocked manner, wherein the workpieces are stopped at one or more holding positions and a gas stream flows through them there.

25. The method according to claim 21, wherein gas supply to the treatment chamber and/or gas removal from the treatment chamber are performed discontinuously and/or in clocked manner, wherein in particular a volumetric flow of the gas stream guided through the treatment chamber is reduced and/or interrupted if one or more workpieces are moved and/or arranged in intermediate positions, in particular in undesired intermediate positions.

26. The method according to claim 21, wherein a gas stream flows through the workpieces at least in certain regions or at least partly in a workpiece longitudinal direction.

\* \* \* \* \*